(12) United States Patent
Burkett et al.

(10) Patent No.: US 6,635,089 B1
(45) Date of Patent: Oct. 21, 2003

(54) METHOD FOR PRODUCING COMPOSITE XML DOCUMENT OBJECT MODEL TREES USING DYNAMIC DATA RETRIEVALS

(75) Inventors: Charles Burkett, Chapel Hill, NC (US); John Raithel Hind, Raleigh, NC (US); David Bruce Lection, Raleigh, NC (US); Richard Dean Telford, Cary, NC (US); Leonard Douglas Tidwell, II, Raleigh, NC (US); Jay Unger, Darnestown, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/231,383

(22) Filed: Jan. 13, 1999

(51) Int. Cl.[7] .............................................. G06F 15/00

(52) U.S. Cl. .................... 715/513; 715/523; 715/501.1; 715/511

(58) Field of Search ................................ 707/513, 523, 707/501, 511, 501.1; 715/513, 523, 501.1, 511

(56) References Cited

U.S. PATENT DOCUMENTS

| | | | | |
|---|---|---|---|---|
| 5,870,549 A | * | 2/1999 | Bobo, II | 709/206 |
| 5,987,480 A | * | 11/1999 | Donohue et al. | 707/501 |
| 6,088,675 A | * | 7/2000 | MacKenty et al. | 704/270 |
| 6,173,316 B1 | * | 1/2001 | De Boor et al. | 709/202 |
| 6,226,675 B1 | * | 5/2001 | Meltzer et al. | 709/223 |
| 6,269,336 B1 | * | 7/2001 | Ladd et al. | 379/88.13 |
| 6,356,920 B1 | * | 3/2002 | Vandersluis | 707/501 |
| 6,401,074 B1 | * | 6/2002 | Sleeper | 235/383 |
| 6,418,446 B1 | * | 7/2002 | Lection et al. | 709/203 |

OTHER PUBLICATIONS

Deutsch et al., "XML–QL: A Query Language for XML", http://www.w3.org/TR/NOTE–xml–ql/, Aug. 10, 1998, pp. 1–19.*
McManus et al., "Taking Advantage of The Document Object Model", wysiwyg://18/http:/www.webtechiniques.com/archives/1998/03/mcmanus/, Mar. 1998, pp. 1–11.*
Robie et al., "What is the Document Object Model ?", Oct. 1, 1998, pp. 1–5.*
Cseri et al., "Building XML Parsers for Microsoft's IE4", Oct. 2, 1997, pp. 1–13.*
Dietl et al., "The World Wide Web Consortium Issue DOM Level 1 as a W3C Recommendation", Oct. 1, 1998, pp. 1–2.*
Rathe, "Other Page Tags", Jan. 1, 1998, pp. 1–3.*

* cited by examiner

*Primary Examiner*—Stephen S. Hong
*Assistant Examiner*—Thu V. Huynh
(74) *Attorney, Agent, or Firm*—Jeanine S. Ray-Yarletts; Marcia L. Doubet

(57) ABSTRACT

A method, system, and computer-readable code for a technique with which files encoded according to the Extensible Markup Language (XML) notation can be marked up to indicate that the content of the file (or some portion thereof) is dynamic in nature and is to be updated automatically to reflect changing information. The proposed technique provides a novel way to specify that a data repository should be accessed as the source of the updates. Techniques are defined for specifying that this data repository access occurs once, and for specifying that it occurs when a set of conditions are satisfied (which may include periodically repeating the data repository access and content update). In one aspect, the data repository is a database; in another aspect, the data repository is a file system. Preferably, the Lightweight Directory Access Protocol (LDAP) is used as an access method when the data repository being accessed is a database storing an LDAP directory.

18 Claims, 29 Drawing Sheets

```
401 <USER-INTERFACE>
402   <PANEL>
403     <QUERY>
404       <KEY>
405         <CN>John A. Smith</CN>
406         <OU>UserInterface</OU>
              <OU>PanelOne</OU>
407         <RETURN-ATTRIBUTE>xmlText</RETURN-ATTRIBUTE>
408       </KEY>
409     </QUERY>
410   </PANEL>
411 </USER-INTERFACE>
```

```
401  <USER-INTERFACE>
402    <PANEL>
421      <TEXTFIELD ID="LastName" CAPTION="Enter Last Name"/>
422      <TEXTFIELD ID="FirstName" CAPTION="Enter First Name"/>
423      <PUSHBUTTON ID="OK" CAPTION="OK"/>
410    </PANEL>
411  </USER-INTERFACE>
```

```
<USER-INTERFACE>
  <PANEL>
427 <QUERY>
    <KEY>
      <CN>John A. Smith</CN>
      <OU>UserInterface</OU>
      <OU>PanelOne</OU>
      <RETURN-ATTRIBUTE>xmlText</RETURN-ATTRIBUTE>
    </KEY>
428 <DEFAULT-VALUES>
430   <LABEL>You got the generic input because of a database error</LABEL>
431   <TEXTFIELD ID="LastName" CAPTION="Enter Your Last Name" />
432   <TEXTFIELD ID="FirstName" CAPTION="Enter Your First Name"/>
433   <PUSHBUTTON ID="OK" CAPTION="OK"/>
    </DEFAULT-VALUES>
434 <QUERY-ERROR>
435 </QUERY-ERROR>
436 </QUERY>
  </PANEL>
</USER-INTERFACE>
```

```
<NODE>
501<INCLUDE>
    502<URI>http://www.x.com/intro.xml</URI>
    510<REFRESH-WHEN><AT-INIT/><OR/>
        <EVERY><SECONDS>10</SECONDS></EVERY>
    512</REFRESH-WHEN>
505</INCLUDE>
</NODE>
```

```
601 <USER-INTERFACE>
  603 <PANEL>
    605 <QUERY>
      610 <KEY>
            <CN>John A. Smith</CN>
            <OU>UserInterface</OU>
            <OU>PanelOne</OU>
            <RETURN-ATTRIBUTE>xmlText</RETURN-ATTRIBUTE>
      612 </KEY>
      614 <QUERY-RESULTS>
      616 </QUERY-RESULTS>
    620 </QUERY>
  604 </PANEL>
602 </USER-INTERFACE>
```

```
601 <USER-INTERFACE>
603   <PANEL>
605     <QUERY>
610       <KEY>
            <CN>John A. Smith</CN>
            <OU>UserInterface</OU>
            <OU>PanelOne</OU>
            <RETURN-ATTRIBUTE>xmlText</RETURN-ATTRIBUTE>
612       </KEY>
          <REFRESH-WHEN>
613         <EVERY><MINUTES>15</MINUTES></EVERY>
          </REFRESH-WHEN>
614       <QUERY-RESULTS>
616       </QUERY-RESULTS>
620     </QUERY>
604   </PANEL>
602 </USER-INTERFACE>
```

```
705 <TRANSACTION>
710  <PAYMENT>
715   <FROM-ACCOUNT>1234.5</FROM-ACCOUNT>
720   <TO-ACCOUNT>1234.8</TO-ACCOUNT>
725   <AMOUNT>1250.00</AMOUNT>
730  </PAYMENT>
735 </TRANSACTION>
```

```
755 <TRANSACTION>
760   <PAYMENT>
765     <FROM-ACCOUNT>1234.5</FROM-ACCOUNT>
770     <TO-ACCOUNT>1234.8</TO-ACCOUNT>
775     <QUERY>
780       <CN>123-45-67-8</CN>
785     </QUERY>
790   </PAYMENT>
795 </TRANSACTION>
```

METHOD FOR PRODUCING COMPOSITE XML DOCUMENT OBJECT MODEL TREES USING DYNAMIC DATA RETRIEVALS

BACKGROUND OF THE INVENTION

1. Field of the Invention

The present invention relates to a computer system, and deals more particularly with a method, system, and computer-readable code for dynamically constructing Document Object Model trees for Extensible Markup Language documents. A composite tree is constructed by using the results of a dynamic data retrieval, along with a predefined static portion of a tree, to create the resulting composite tree.

2. Description of the Related Art

Document Object Model, or "DOM", is a language-independent application programming interface ("API") for use with documents specified in the Standard Generalized Markup Language ("SGML") or a derivative of SGML. SGML is a language that provides for a platform-independent specification of document content and formatting. In particular, DOM is intended for use with the HyperText Markup Language ("HTML") and Extensible Markup Language ("XML") derivatives of SGML. DOM is published as a Recommendation of the World Wide Web Consortium, titled "Document Object Model (DOM) Level 1 Specification, Version 1.0" (1998) and available on the World Wide Web at http://www.w3.org/TR/RECDOM-Level-1. (Refer to ISO 8879, "Standard Generalized Markup Language (SGML)", (1986) for more information on SGML. Refer to "Extensible Markup Language (XML), W3C Recommendation Feb. 10, 1998" which is available on the World Wide Web at http://www.w3.org/TR/1998/REC-xml-19980210, for more information on XML.)

The DOM API enables application programs to access a tree-oriented abstraction of a document, and to manipulate document structure and contents (that is, by changing, deleting, and/or adding elements). Further, the DOM enables navigating the structure of the document. While the term "document" is used herein when discussing XML and the corresponding DOM trees, it is to be understood that the information represented using XML may represent any type of information, and is not limited to the traditional interpretation of the word "document". For example, XML may be used to represent the layout of a user interface for an application program, or the data to be used with a program. For ease of reference, the term "document" will be used herein to refer to these diverse types of information. "DOM tree" refers to the logical structure with which a document is modelled using the DOM. A DOM tree is a hierarchical representation of the document structure and contents. Each DOM tree has a root node and one or more leaf nodes, with zero or more intermediate nodes, using the terminology for tree structures that is commonly known in the computer programming art. A node's predecessor node in the tree is called a "parent" and nodes below a given node in the tree are called "child" nodes.

While the DOM applies to both HTML and XML, HTML is not pertinent to the scope of the present invention. Thus, the subsequent DOM discussions will be in terms of using the DOM with XML. XML is a standardized formatting notation, created for structured document interchange on the World Wide Web (hereinafter, "Web"). XML is a tag language, where specially-designated constructs referred to as "tags" are used to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data: a corresponding tag may also be inserted following the data, to clearly identify where that data ends. As an example of using tags, the syntax "<email>" could be used as a tag to indicate that the character string appearing in the data stream after this tag is to treated as an e-mail address; the syntax "</email>" would then be inserted after the character string, to delimit where the e-mail character string ends.

The syntax of XML is extensible, providing users the capability to define their own tags. As previously stated, XML is based on SGML, which is an international standard for specifying document structure. XML is a simplified version of SGML, tailored to Web document content.

XML is widely accepted in the computer industry for defining the semantics (that is, by specifying meaningful tags) and content of the data encoded in a file. The extensible, user-defined tags enable the user to easily define a data model, which may change from one file to another. When an application generates the tags (and corresponding data) for a file according to a particular data model and transmits that file to another application that also understands this data model, the XML notation functions as a conduit, enabling a smooth transfer of information from one application to the other. By parsing the tags of the data model from the received file, the receiving application can re-create the information for display, printing, or other processing, as the generating application intended it.

Note that the word "file" is used throughout this disclosure to refer to stored data. This is for ease of reference only, and is not meant to imply any particular structure for storing the data, such as conventional "flat files". The data with which the present invention may be beneficially used may be stored in any number of ways without deviating from the inventive concepts disclosed herein, such as: a data element in a database, an object attribute in a directory entry, an object in flash memory, etc.

When an XML parser processes an XML file, it reads the file and constructs a DOM tree based on the syntax of the tags embedded in the file and the interrelationships between those tags. The tag syntax is stored in the nodes of the DOM tree, and the shape of the tree is determined from the tag relationships. The DOM specification is defined to provide "structural isomorphism"—that is, any XML parser that parses a given XML input file will create an identical DOM tree. The DOM interface is used to change the structure and/or contents of the DOM tree, as previously stated. (Optionally, the XML document may also be revised to reflect this changed information.)

XML may be used to represent any type of structured information, as stated previously. One area in which XML is increasingly important is with on-line directory services. "Directory service" refers generically to a repository of information, along with the access methods and other services that are used with the repository. A particular approach to implementation of a directory service is specified as an international standard in ISO/IEC 9594-1, "The Directory: Overview of Concepts, Models, and Services" (1995), which is also published as ITU Recommendation X.500. An "X.500 Directory" is a directory service according to these specifications. X.500 directories are widely used in the Internet and Web for providing centralized storage and management of information. XML notation is one form in which information may be stored within a directory.

A communications protocol is used to access the stored information in an on-line directory. A popular protocol for accessing directories, such as X.500 directories, is the Lightweight Directory Access Protocol (hereinafter, "LDAP"). LDAP does not require X.500 directory services, and many implementations of LDAP use directory stores other than X.500. LDAP is specified as IETF (Internet Engineering Task Force) RFC (Request For Comments) 2251. When using LDAP with a directory, the queries to the database (and the results of these queries) may be specified using a proxy that translates between LDAP API calls and XML syntax. The phrase "LDAP Directory" is used herein to refer to directories accessed using LDAP.

The flexibility of XML enables it to be used to represent complex information. Using the DOM APIs, XML can be used not just with information that is static in nature, but also with information that changes dynamically. With changing information, a DOM tree is created that represents an initial state of the information; this DOM tree may then be altered to reflect the dynamic changes. If new content is required, new nodes are added to the DOM tree to reflect the changed state of the content. The corresponding nodes are removed from the DOM tree if content is to be deleted. And the nodes of the DOM tree are changed when content is to be changed.

Currently, DOM trees are only updated using the DOM APIs upon a specific API invocation from an executing application program. It would be advantageous to be able to specify directly in the content of an XML document that this content (or selected portions thereof) is dynamic in nature, such that specific values in the content are to be dynamically obtained when an application program is ready to use the XML document. As a further extension of this concept, it would be advantageous to provide a mechanism for dynamically refreshing the content of an XML document according to a specified set of conditions, which may include periodic refreshes. There are no known techniques with which this type of dynamic processing can be specified in XML content (nor with which the corresponding DOM trees can be updated).

Accordingly, a need exists for a technique with which documents encoded according to the XML notation can be marked up to indicate that the content of the document (or some portion thereof) is dynamic in nature and is to be updated dynamically to reflect changing information. The proposed technique provides a novel way to specify that a data repository should be accessed as the source of the updates. Techniques are defined for specifying that this data repository access occurs once, and for specifying that it is to be refreshed when a set of conditions are satisfied (which may include periodically repeating the data repository access and content update). Preferably, LDAP is used as an access method when the data repository being accessed is an LDAP directory.

SUMMARY OF THE INVENTION

An object of the present invention is to provide a technique whereby documents encoded according to the XML notation can be marked up to indicate that the content of the document (or some portion thereof) is dynamic in nature.

Another object of the present invention is to provide a technique whereby documents encoded according to the XML notation can be marked up to indicate that the corresponding DOM tree is to be updated dynamically to reflect changing information.

Still another object of the present invention is to provide this technique whereby the XML markup specifies that a data repository should be accessed as the source of the updates.

It is another object of the present invention to provide this technique whereby the markup specifies that a dynamic update occurs once.

A further object of the present invention is to provide this technique whereby the markup specifies that a dynamic refresh occurs when a set of conditions are satisfied (which may include periodically repeating the data repository access and content update).

Yet another object of the present invention is to provide this technique whereby LDAP is used as an access method, and where the data repository being accessed is an LDAP directory.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process, a system, and a method for use in a computing environment having a connection to a network, for dynamically constructing DOM trees using dynamic data retrievals. This comprises: reading an input file encoded in a derivative of Standard Generalized Markup Language (SGML); creating a DOM tree from the encoded file during the reading; traversing the created DOM tree; detecting one or more dynamic data retrieval tags in the DOM tree during the traversing; invoking a dynamic data retrieval for each of the detected data retrieval tags, wherein the dynamic query uses one or more parameters specified for the detected data retrieval tag; and reflecting results of each of the dynamic data retrievals in said created DOM tree. As one option, this may further comprise updating the encoded file to reflect the results of each of the dynamic data retrievals. As an alternative option, this may further comprise: detecting one or more error-handling tags that may be specified with each of the detected data retrieval tags; and wherein the reflecting results further comprises using a default specification from the detected error-handling tags when the dynamic data retrieval returns an error condition. With this alternative option, the encoded file may be updated to reflect the results of each of the dynamic data retrievals, as in the first option, but wherein the updating further comprises using the default specification from the detected error-handling tags when the dynamic data retrieval returns an error condition. Preferably, the derivative is Extensible Markup Language (XML).

The process, system, and method may further comprise: substituting a value of a variable name for a dynamic reference to the variable name; and using the substituted value during the dynamic data retrieval. Or, they may further comprise: detecting one or more conditional refresh tags in the DOM tree during the traversing; evaluating the conditional refresh tags; and refreshing the DOM tree when the conditional tag evaluates to true. The detected dynamic retrieval tags may specify one or more of: a database query retrieval and a file system retrieval. Optionally, these may further comprise: detecting a periodic refresh syntax specified with one or more of the detected database query retrieval tags; and periodically refreshing the DOM tree according to the periodic refresh syntax.

The present invention will now be described with reference to the following drawings, in which like reference numbers denote the same element throughout.

BRIEF DESCRIPTION OF THE DRAWINGS

FIGS. 4A–4H illustrate an example of a first aspect of the invention, which dynamically retrieves information from a database;

FIGS. 5A–5E illustrate an example of a second aspect of the invention, which dynamically retrieves information from a file store;

FIGS. 6A–6C illustrate an example of a third aspect of the invention, which enables periodically refreshing the information retrieved from a database upon occurrence of specified conditions;

FIGS. 7A–7B illustrate examples of how executable tasks may be represented in XML, where one task is statically specified according to the prior art and another task is specified according to the present invention so that information will be dynamically retrieved and reflected in the task execution.

DESCRIPTION OF THE PREFERRED EMBODIMENT

Figure 1:
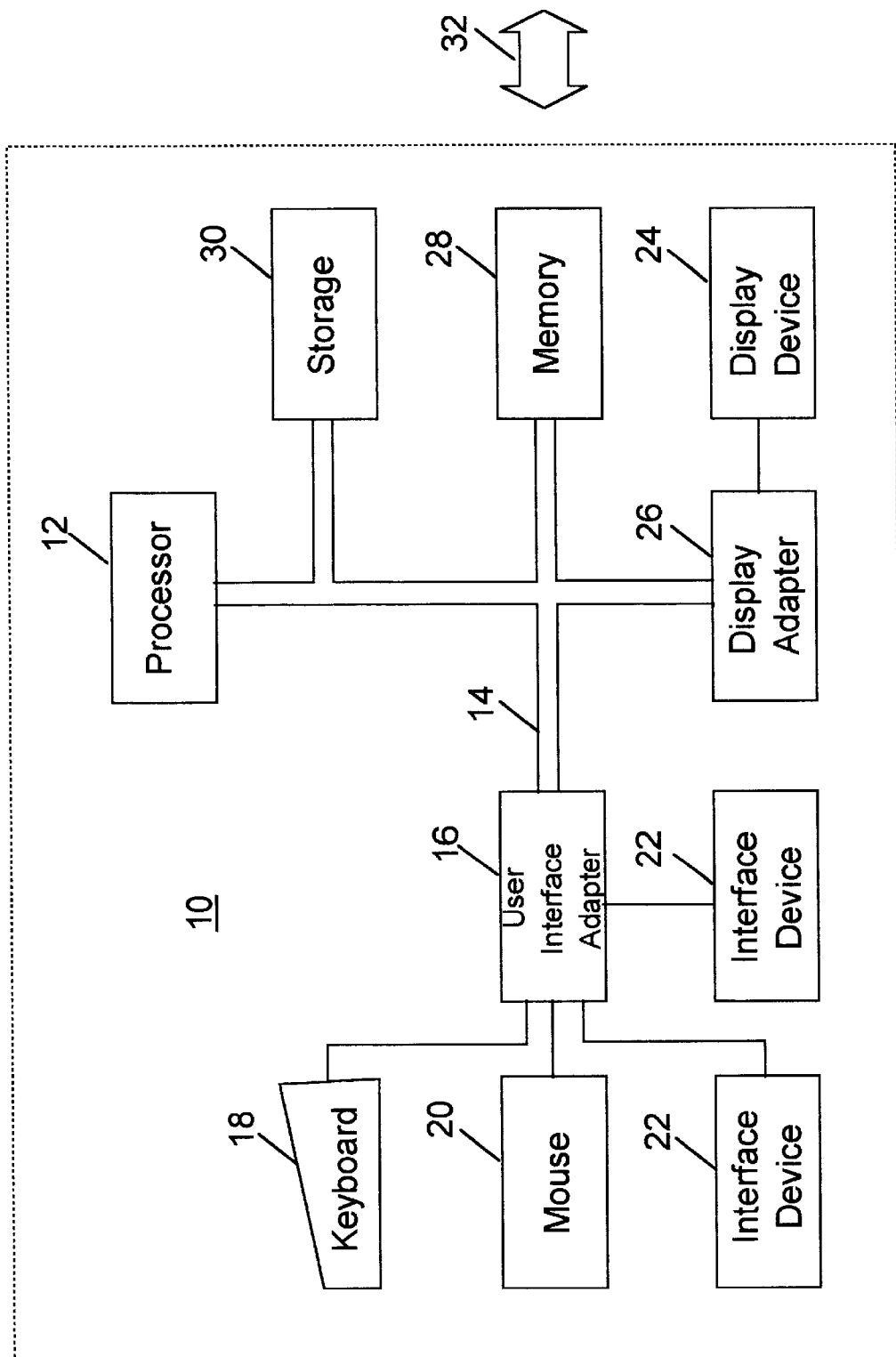
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
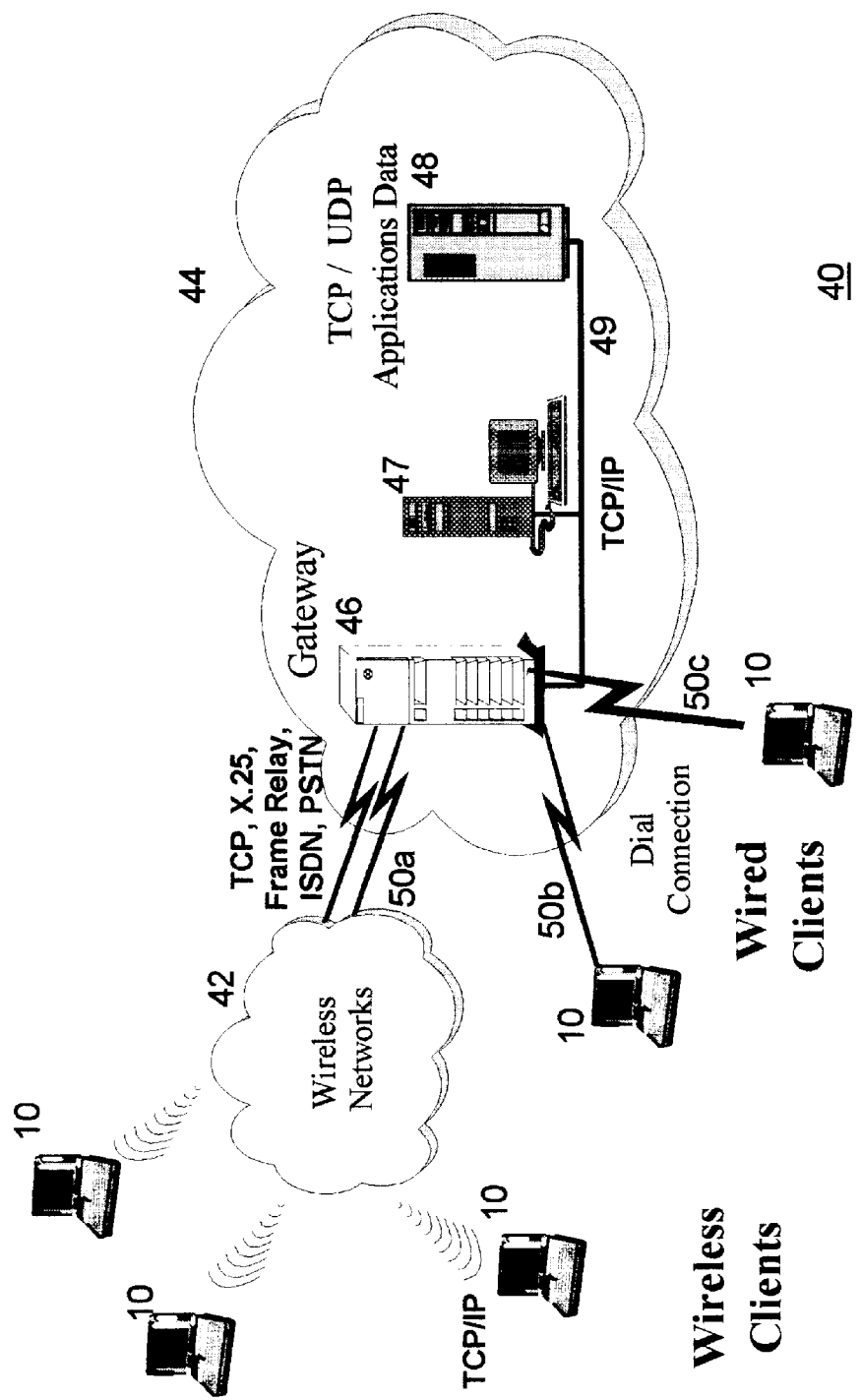
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 or server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In the preferred embodiment, the present invention is implemented as one or more computer software programs. The implementation of the software of the present invention may operate on a user's workstation, as one or more modules (also referred to as code subroutines, or "objects" in object-oriented programming) which are invoked upon request. Alternatively, the software may operate on a server in a network, or in any device where an application program executes using XML documents and DOM trees. The logic implementing this invention may be integrated within the code of an application program which uses XML document files, or it may be implemented as one or more separate utility modules, which are invoked by that application, without deviating from the inventive concepts disclosed herein. The application may be executing in a Web environment, where a Web server provides services in response to requests from a client connected through the Internet. Alternatively, the application may be executing in a corporate intranet or extranet, or in any other network environment. Configurations for the environment include a client/server network, as well as a multi-tier environment. These environments and configurations are well known in the art.

The preferred embodiment of the present invention will now be discussed in more detail with reference to FIGS. 3 through 14. A first aspect of the present invention retrieves information dynamically from a database. An example of this aspect is presented in FIG. 4 (comprising FIGS. 4A–4H). A second aspect retrieves information from a file store. This aspect is shown as an example in FIG. 5 (comprising FIGS. 5A–5E). And a third aspect enables periodically refreshing the results of a database query. This third aspect is illustrated by an example in FIG. 6 (comprising FIGS. 6A–6C).

Several optional features may be used with these various aspects as well. A first option is a syntax to dynamically retrieve one or more values to be used on a query or file retrieval from a stored variable. This option is discussed in FIG. 4 for queries, although it applies to all aspects equally. A second option is specifying default content to be used for error-handling, should the database query or file system retrieval encounter an error. This option is also discussed in FIG. 4, and also applies to all aspects equally. The database query and file system retrieval may be refreshed upon occurrence of a specified condition. A one-time refresh capability is discussed in FIG. 5 for file system retrievals, although this capability also applies to database queries. (The periodic repeatable refresh applies only to queries, and is presented in FIG. 6.)

As previously stated, the flexibility of the XML notation enables it to be used to specify virtually any type of structured information. The present invention will be described with reference to several different types of information, illustrating this flexibility. In one example (discussed with reference to FIGS. 3–6), XML notation specifies the layout of information on a user interface panel. The present invention may also be used with other types of objects, which would be specified in a manner similar to this user interface layout. In another example (discussed with reference to FIGS. 7A–7B), the notation specifies a database transaction that is to be executed by an application program. The present invention may also be used with other types of tasks similarly specified.

Figure 3A:
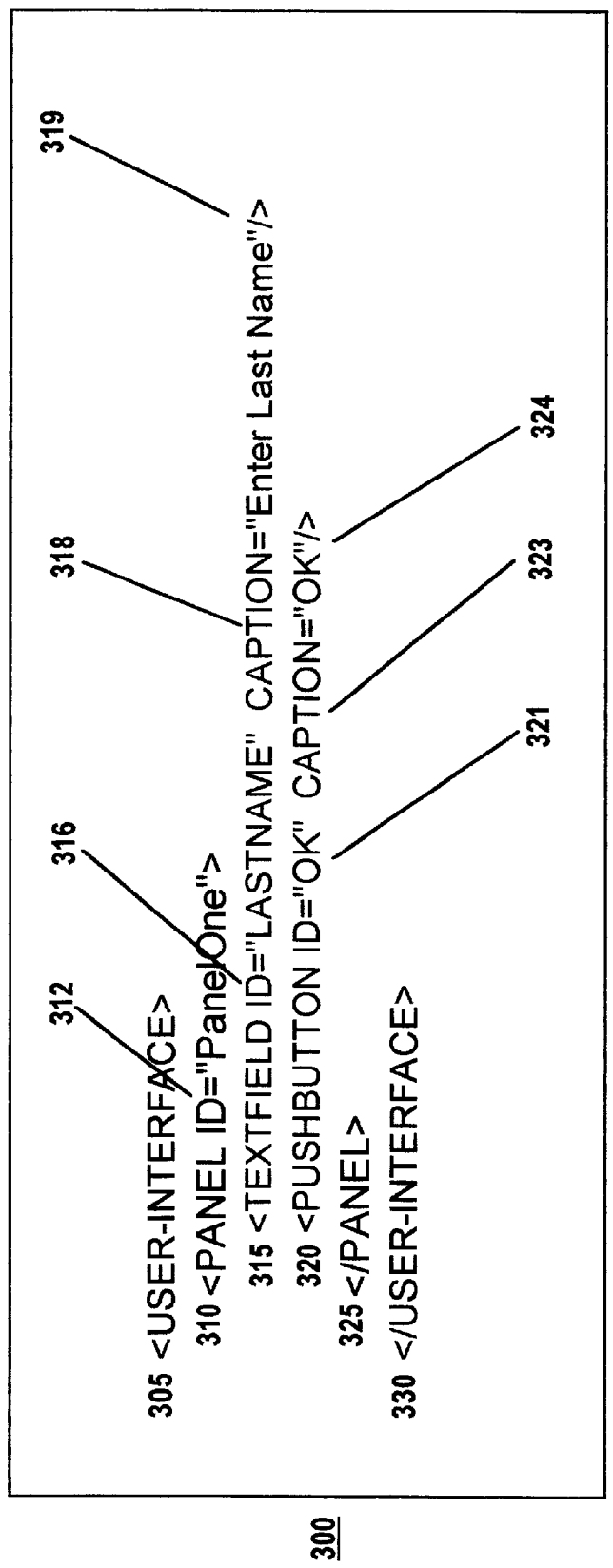
FIGS. 3A–3B illustrate a simple example of XML notation used to statically specify a user interface panel, and the DOM tree that corresponds to this specification, according to the prior art.

In FIG. 3A, a simple user interface layout 300 is specified using XML. The opening tag 305 and closing tag 330 indicate to a human reader that this is a specification of a user interface. A properly adapted software program will also recognize what this specification is, as is obvious to one of ordinary skill in the art, where the software program is written to expect these particular tags and to process them according to application-specific requirements.

The next opening tag 310 and closing tag 325 indicate that the user interface consists of a panel. At 312, an "ID" attribute is used, having a value of "PanelOne". The panel further comprises a text field and a pushbutton. The text field is specified at 315, and the pushbutton is specified at 320. Both 315 and 320 use the XML shorthand notation whereby a closing tag may be omitted by replacing the ">" symbol at the end of the opening tag with a "I>" symbol (at 319 and 324). The text field is given an identifier of "LASTNAME" using an "ID" attribute 316, and has a caption "Enter Last Name" specified using a "CAPTION" attribute 318. Similarly, the pushbutton is given an identifier of "OK" at 321 and a caption of "OK" at 323.

Figure 3B:
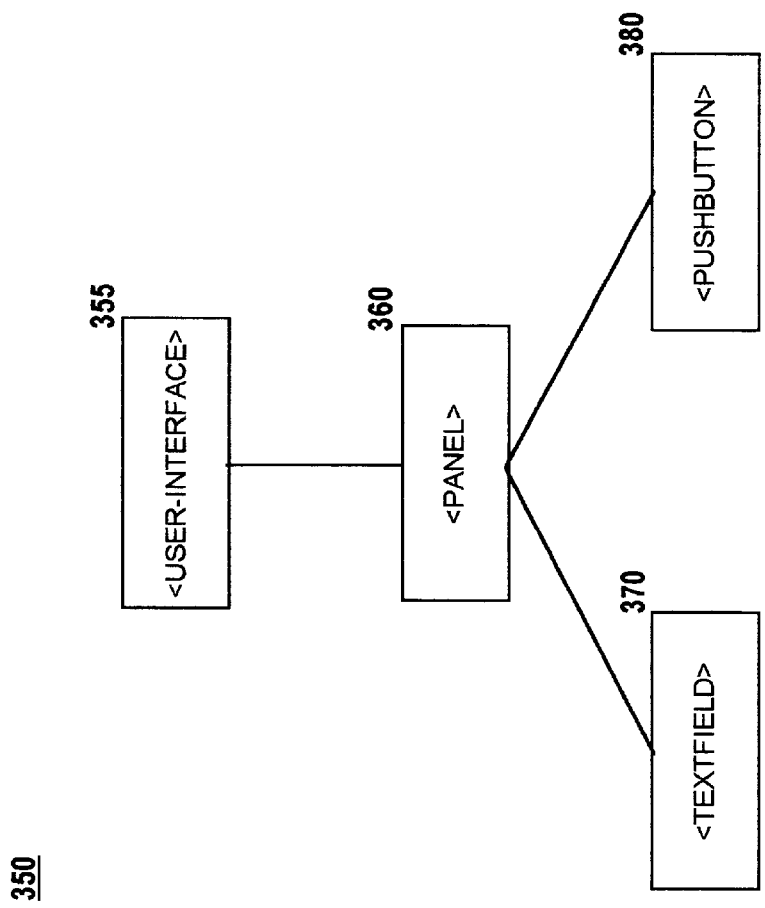

FIG. 3B shows the DOM tree 350 that corresponds to the XML notation specified in FIG. 3A. The specification and the DOM tree that models it are static in nature, because the prior art technique for using XML to specify document content (here, a user interface layout) has been used. A root node 355 corresponds to the top-most level 305 of XML tag in the document 300. This root node 355 has one child node 360, corresponding to the single element 310 at the next (second) level of the structure specified in the document 300. This child node 360 is then a parent node for two child nodes 370 and 380. Node 370 corresponds to the third-level tag at 315, and node 380 corresponds to the third-level tag at 320. As previously stated, the XML document specified at 300 is typically parsed once when an application begins to use it, creating the static DOM tree 350. An application program that will use this example to display a user interface panel can determine the panel identifier by traversing the DOM tree to find the node 360 which contains the ID attribute and its value. The application can further determine that this panel is to have a single text field and a single pushbutton by traversing to the next level in the tree beneath the panel node 360. The identifier to be associated with the text field is located in the Textfield node 370 (where the attribute value will be stored as instance data associated with the node), and the caption to be displayed for this text field is determined from this node 370 as well. The identifier for the pushbutton, and the caption to display on the button, are located in a similar manner. Techniques for traversing a tree such as the DOM tree of FIG. 3B are well known in the art.

FIGS. 4A–4H illustrate how the present invention can be used to dynamically retrieve an object such as a user interface specification, and a preferred syntax with which the XML document indicates that dynamic retrieval and update is to be performed. This example illustrates use of the present invention to perform a one-time query of a database in order to retrieve the dynamic content to be used. In addition, this example discusses optional use of a variable to specify values used in the query, and illustrates use of an optional error-handling technique for specifying default values to be used upon occurrence of an error.

This type of dynamic retrieval will be particularly advantageous as a technique for providing customized document content based on parameters that are specified for the query.

For example, an application program may need to present one user interface to users in one classification, and a different user interface to other users. The classification of users for determining which interface to present may be based on their belonging to a particular group, having a particular identifying characteristic, etc. Suppose, for example, that the application program is an employee payroll application, and the panel of interest is related to year-to-date withholding tax payments. Most users will only be able to view this information—that is, they will see it in read-only mode. However, a payroll administrator may be authorized to change this information, perhaps in the situation where some type of error has occurred. For this user, the panel needs to be used for write mode of the underlying data as well as read mode, and may need to have extra data entry fields (to enter the revised data) and possibly additional information such as extra text fields, extra pushbuttons, etc. According to the present invention, these different users can be accommodated by storing different user interface layout objects for each application-specific user classification in a data repository; indicating in the XML document that the user interface object is to be dynamically retrieved for presentation to an individual user; and specifying the data retrieval parameters to be used for a specific user.

FIG. 4A depicts an XML document 400, similar to the document 300 of FIG. 3A but now being adapted to dynamic content retrieval and update. The tags 401, 411 specify that this document 400 comprises user interface information. The tags 402, 410 indicate that this user interface further comprises a panel. Note that the panel tag 402 does not contain an attribute keyword and attribute value specifying the panel identifier, as did the static panel tag 310. This is because the panel identifier in this example is dynamic information which is not yet known. Also, the text field and pushbutton information is not specified, because this information is also being obtained dynamically. A query tag 403 (and its ending tag 409) defined according to the present invention indicates to the program processing the XML document 400 that dynamic information is needed within the panel. (The manner in which this tag is processed is discussed in more detail below with reference to FIG. 8.) Note that this example shows the panel containing a single level of dynamic information, where only one set of opening and closing query tags 403, 409 is encoded within the opening and closing tags 402, 410 for the panel. This is for illustrative purposes only: many alternative document structures (including more than one dynamic query) can be specified, as will be obvious to one of ordinary skill in the art. The query tag 403 uses a special keyword syntax "QUERY". This syntax is also to be considered illustrative: any alternative keyword or keyword string can be used equivalently without deviating from the inventive concepts of the present invention, provided of course that no conflicting semantics are defined for that alternative syntax and that the implementation is adapted to process that syntax.

The logic that processes an XML document (and/or the corresponding DOM tree) containing the special query keyword will be adapted, according to the present invention, to recognize this syntax as requiring a one-time data repository access and retrieval. In one aspect of the preferred embodiment, the repository being accessed is a file system. In another aspect, the repository being accessed is a database. In a preferred embodiment, this database is a directory using X.500 or LDAP concepts, whereby database entries are organized using "distinguished names". Distinguished names (hereinafter, "DNs") use a well-known syntax that is described in IETF RFC 1779, "A String Representation of Distinguished Names" (March 1995), the details of which do not form part of the present invention. For this aspect of the preferred embodiment, the parameters to be used for the query are specified using a "KEY" tag 404 (and closing KEY tag 408). The values within the KEY tag will be used on the database query command, and will be formatted on that command in accordance with the requirements of the particular database being accessed. (The word "database" is used herein when referring to dynamic retrievals using keys. This is to be understood as including retrieval from directories.) When the database is an X.500 or LDAP directory, DNs are used as database keys Accordingly, the key in this example begins with a specification of the DN as a sequence of RDN (Relative Distinguished Name) tag values, the first of which 405 in this case is the leaf attribute CN (Common Name) and proceeds back to the directory tree root by specifying, in this case, OU (Organizational Unit) RDNs 406. Parameter 407, specified using a "RETURN-ATTRIBUTE" tag and a value (shown in this example as "xmlText"), is used in the present invention to indicate that what should be retrieved from the directory entry located using the RDN parameters is an XML document. Using the values shown in FIG. 4A, the collection of parameters 405, 406, 407 will be used as a database key to retrieve an attribute containing an XML document from the directory entry having RDNs of CN="John A. Smith", OU="Userinterface", OU="PanelOne".

When the key parameters are not known in advance, a special technique for dynamically determining the values to be used for the key is also defined herein. For the example discussed above where different user interface panels are to be presented to different types of users, it will typically not be possible to statically specify the user's name as a key parameter, as was shown in FIG. 4A at 405. To retrieve the value to be used in this position from an application or system variable, the preferred embodiment uses the syntax $variable-name; where the "$" and ";" are special characters used to indicate the presence of (and to delimit) a variable reference, and the name of the variable is specified between these special characters. Suppose the user's name is stored in a variable called "userName". To locate the name of whoever is the current user of the application, and use that name for the CN in the query of the example in FIG. 4A, element 405 of FIG. 4A would be replaced by <CN>$userName;</CN>. Alternatively, a DOM API call may be used to set the value of a tag to achieve this type of dynamic parameter setting. Note that all key values must be set prior to execution of the query, in order to avoid a query error caused by an improper key value.

Figure 4B:
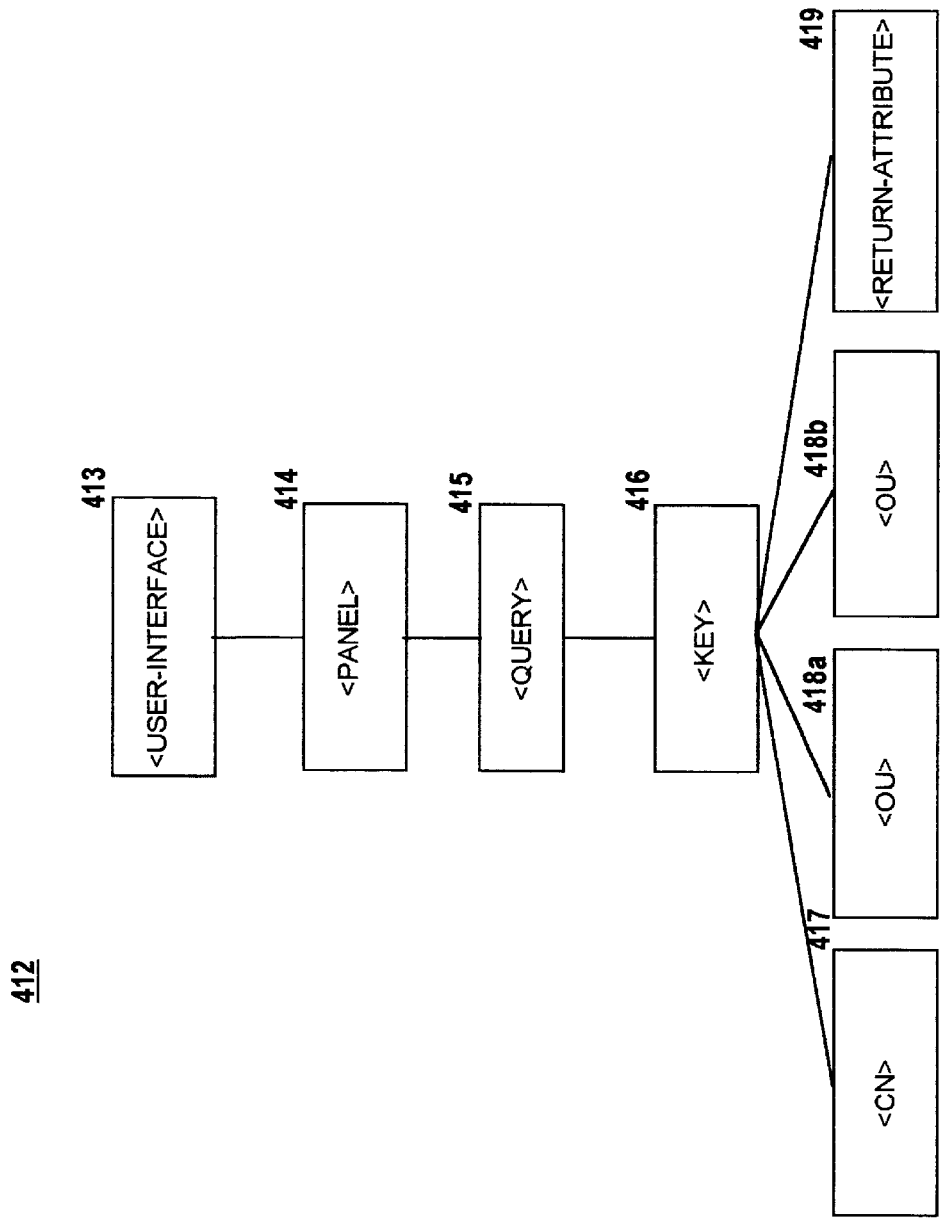

The DOM tree 412 that corresponds to the XML document 400 is shown in FIG. 4B. The tree structure at the first two levels 413, 414 is identical to the structure of the static tree 350 in FIG. 3B. Whereas tree 350 then had a third static level containing two static nodes 370 and 380, the DOM tree 412 now has a third level containing a node 415 that corresponds to the dynamic query tag 403 of FIG. 4A. The DOM tree 412 further contains a fourth level node 416 for the KEY tag, and leaf nodes 417, 418a, 418b, and 419 for the parameters of the key. When the software of the present invention traverses this DOM tree 412, it will recognize that node 415 is a dynamic query node, and invoke a corresponding database query in order to update the DOM tree 412 (shown below in FIG. 4E).

Figure 4C:
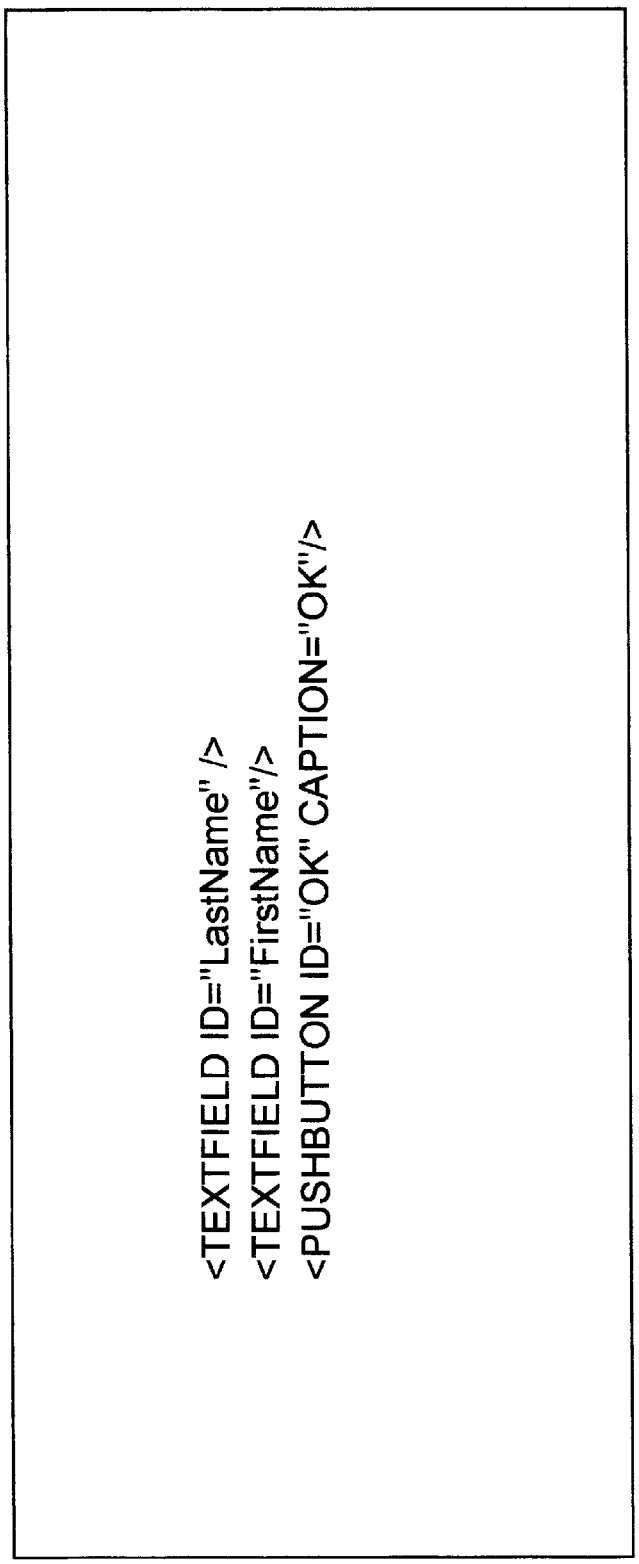

FIG. 4C shows an example of the XML document content 420 that may be stored in the database for the entry identified using DN 405 and 406 using the attribute 407. The preferred embodiment requires the results of the database query to be returned in XML notation, so that the result can be used directly to revise the DOM tree structure, creating a composite tree that contains some static information (such as nodes 413, 414) as well as some dynamically-obtained information. The content 420 returned from the query of this example is this type of dynamically-obtained information.

Figure 4E:
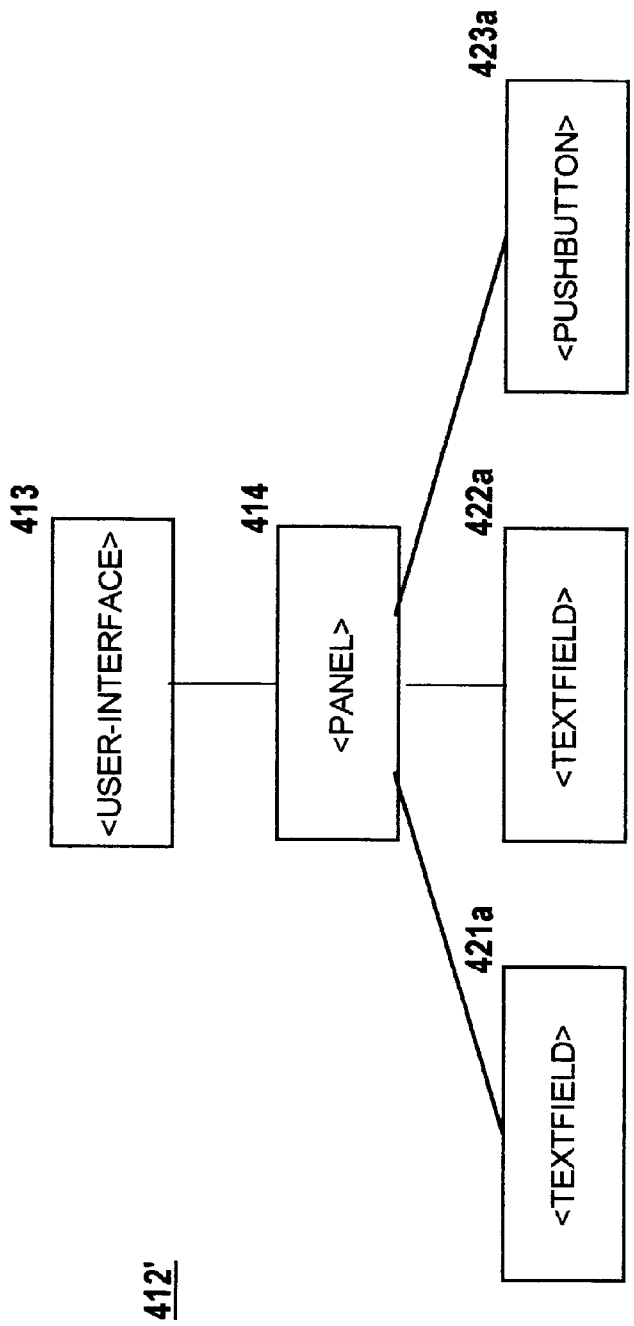

FIG. 4D shows a revised XML document 400' that reflects the results of the database query, and FIG. 4E shows the revised DOM tree 412'. Revising the XML document to incorporate the results of the dynamic retrieval operations of the present invention, thereby keeping the XML document synchronized with the DOM tree, is optional. Whether it will be useful to perform this type of synchronization will depend on the particular application, the structure and content of the document, etc. An updated document is shown in FIG. 4D for purposes of better illustrating the operation of the present invention.

In the XML document 400' in FIG. 4D, static tag pairs 401, 411 and 402, 410 are unchanged from that of document 400 in FIG. 4A. The returned content 420 has been substituted for the special query tags 403, 409, key tags 404, 408, and the query parameters 405, 406, 407. The revised user interface specification 400' indicates that the panel 402 has two text fields 421, 422 and a single pushbutton 423. By comparing the specification 400' in FIG. 4D to the specification 300 in FIG. 3A, it can be seen that the syntax resulting from using the one-time data repository query (FIG. 4A) to dynamically construct an XML document is structurally identical to the syntax of the prior art static query. (The only difference in these examples is an additional text field in FIG. 4A, which is for illustration only.) Thus, the advantageous features of the one-time query of the present invention may be used with an application program that was originally developed for static DOM trees and static XML content. What is required in that case is that a specially-adapted parser is used, that recognizes the dynamic query tags and invokes the database query to create the DOM tree. When the DOM tree is passed from the parser back to the application, the application is not required to be aware that anything dynamic has taken place. (Alternatively, the application program may be specially adapted to recognize dynamic one-time queries, if desired. For example, the parser may return a flag to the application program, where the flag is set to "TRUE" if a dynamic query was executed and set to "FALSE" otherwise. The manner in which such a flag would be used by the application is beyond the scope of the present invention.

The static nodes 413, 414 of the revised DOM tree 412' in FIG. 4E are unchanged from the DOM tree 412. Dynamically-constructed nodes 421a, 422a, 423a representing the returned content 420 have been substituted for the query node 415 and its subtree comprised of nodes 416, 417, 418a, 418b, and 419.

Figure 4G:
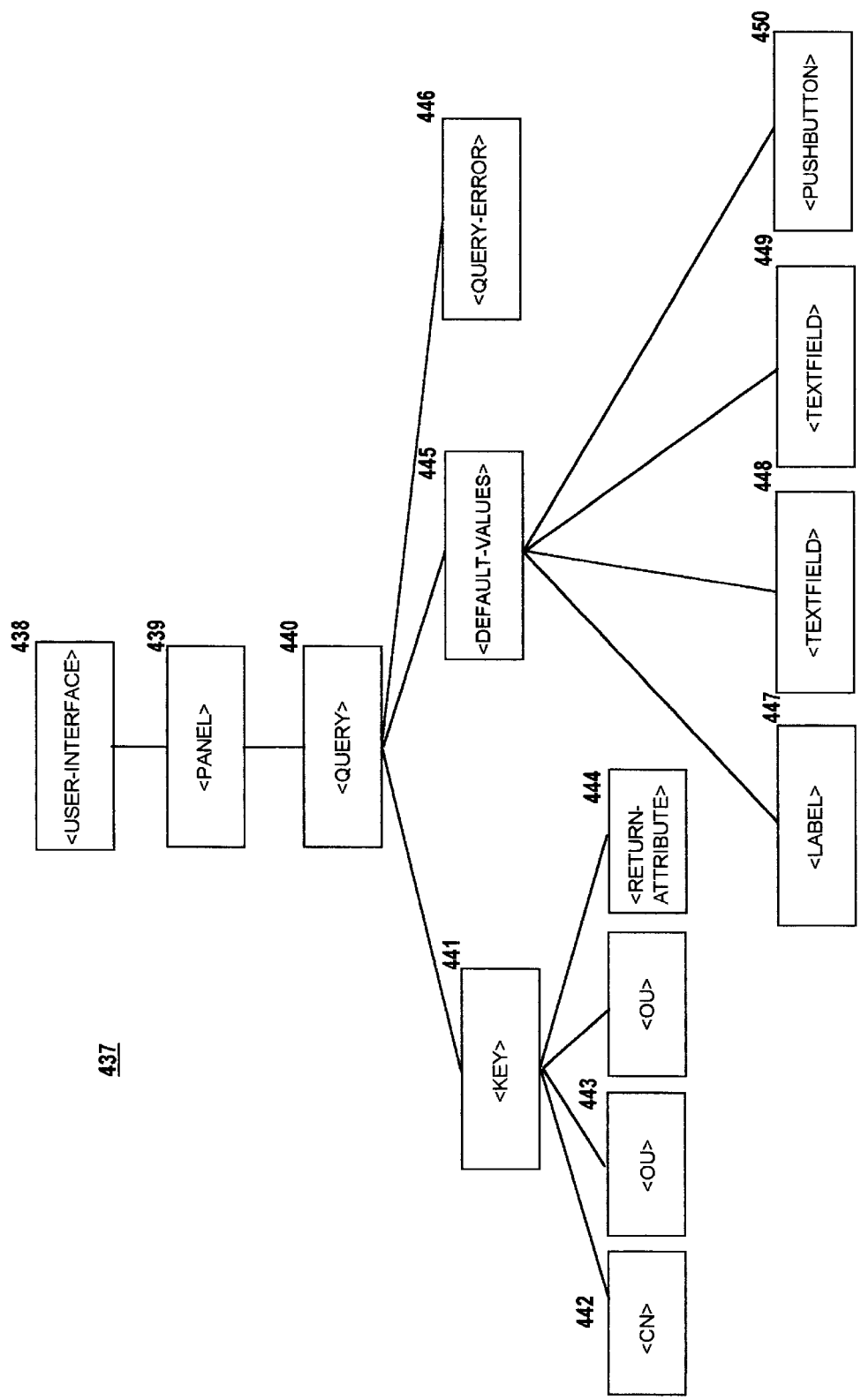
Figure 4H:
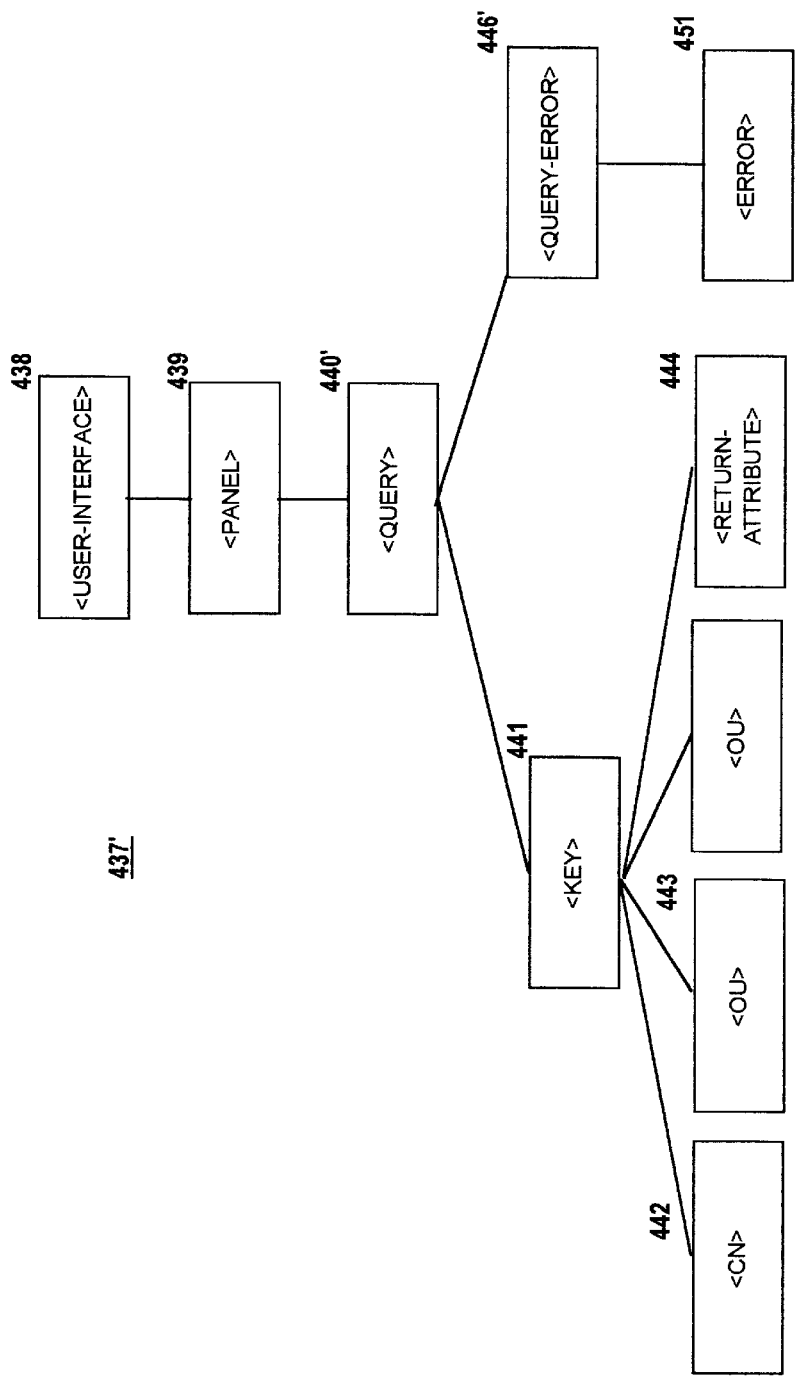

FIGS. 4F–4H depict an enhancement to the query specification syntax used in FIGS. 4A–4E, which may optionally be used with the present invention to specify how error conditions are handled. This error-handling syntax may be used with both the query processing and with the file system retrieval processing (discussed below with reference to FIG. 5). This enhancement enables specification of default XML content, that will be used when a dynamic retrieval specified in an XML document returns an error condition. Specifying defaults for the content in the XML document is optional: if not specified, an error message will be automatically generated upon occurrence of an error (although no default content will be automatically generated). The details of how this processing occurs will be discussed below with reference to FIGS. 8–14.

The XML document 426 shown in FIG. 4F is similar to the document 400 in FIG. 4A, but additionally contains default value content 429 (having opening tag 428), and opening and closing "QUERY-ERROR" tags 434, 435. In FIG. 4F, the tags 434, 435 use the keyword syntax "QUERY-ERROR"; alternative keywords or keyword strings may be used equivalently, as was discussed above with reference to the "QUERY" keyword. Similarly, the keyword "DEFAULT-VALUES" at 428 is merely suggested keyword syntax. The content 429 in this example specifies default content to be used for a user interface panel when no panel content is returned from the data repository because of the error condition. It will be obvious to one of ordinary skill in the art that the content specified for use in an error condition is application-specific.

FIG. 4G shows the DOM tree 437 that corresponds to document 426. The default value tag 428 is represented by node 445, which is a child of the node 440 that specifies the query. The default content 429 for the example specifies that the user interface panel has a label (at 430), two text fields (at 431 and 432) and a single pushbutton (at 433). This content is represented in FIG. 4G, which shows the corresponding nodes 447, 448, 449, 450 as children of the default-values node 445. The query-error tag 434 is represented by node 446.

The DOM tree that results from executing the query 426, and encountering an error, will be unchanged from that of FIG. 4G except that an additional node, containing the suggested keyword "ERROR" (and an appropriate error message) will be added as a child of the QUERY-ERROR node 446. The key information in the subtree 441, and the default values information in the subtree 445, will remain. This is so that the application will have access to the key (perhaps in order to re-execute the query, if desired) and will be able to explicitly detect that an error occurred.

On the other hand, if no error occurs, the DOM tree that results from this query will be similar to that shown in FIG. 4E as DOM tree 412'. In fact, if the stored information for the key used in FIG. 4F has two textfields and one pushbutton, the resulting DOM tree structure will be identical to tree 412'.

The DOM tree that results from executing the query 427 in document 426, and encountering an error, will be unchanged from that of FIG. 4G except that an additional node, containing the suggested keyword "ERROR" (and an appropriate error message) will be added as a child of the QUERY-ERROR node 446. The key information in the subtree 441, and the default values information in the subtree 445, will remain. This is so that the application will have access to the key (perhaps in order to re-execute the query, if desired) and will be able to explicitly detect that an error occurred.

Figure 5A:
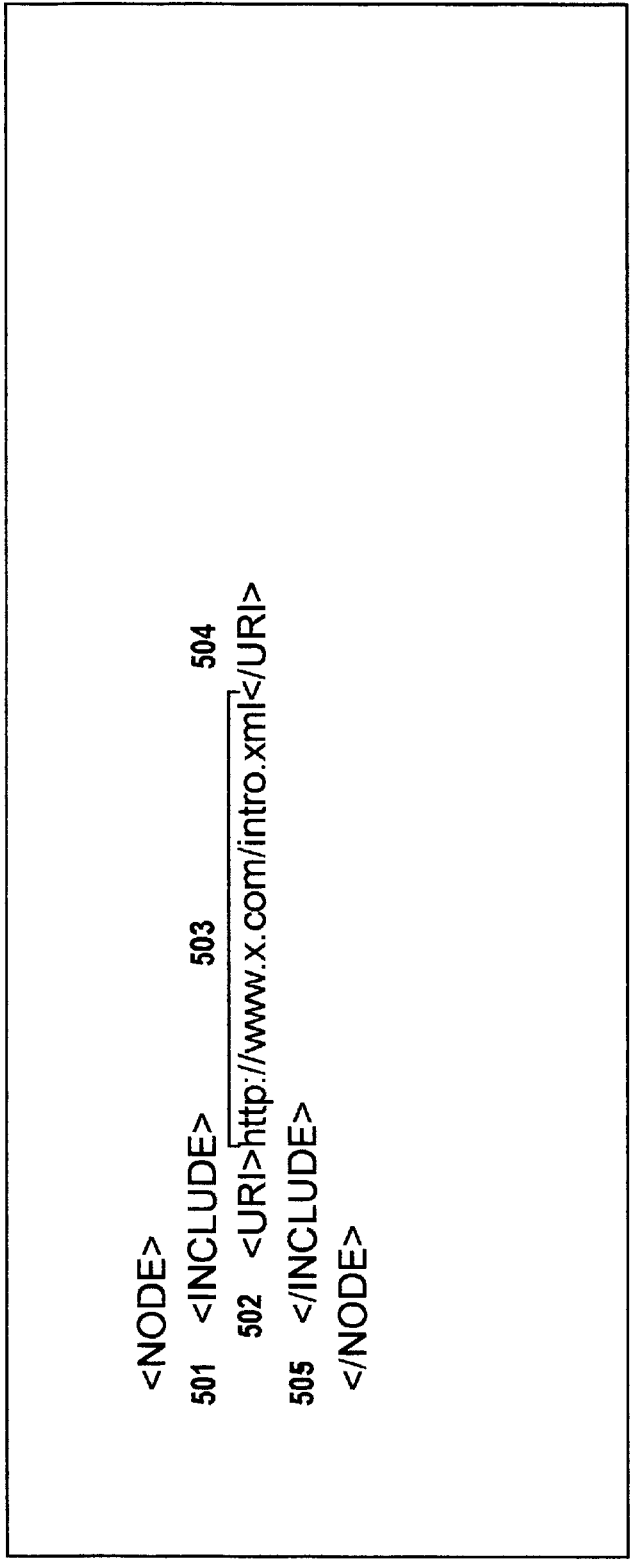
Figure 5B:
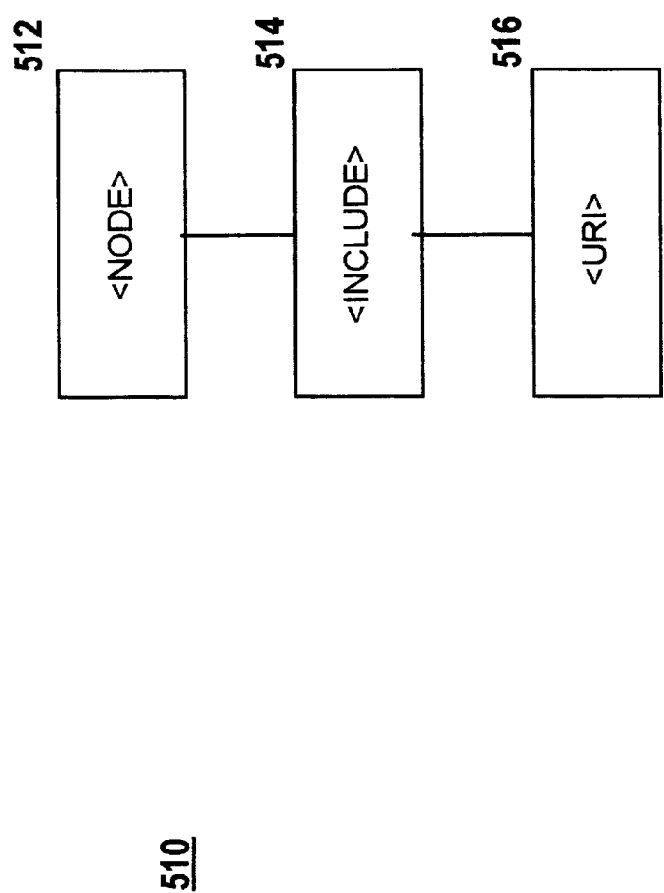
Figure 5C:
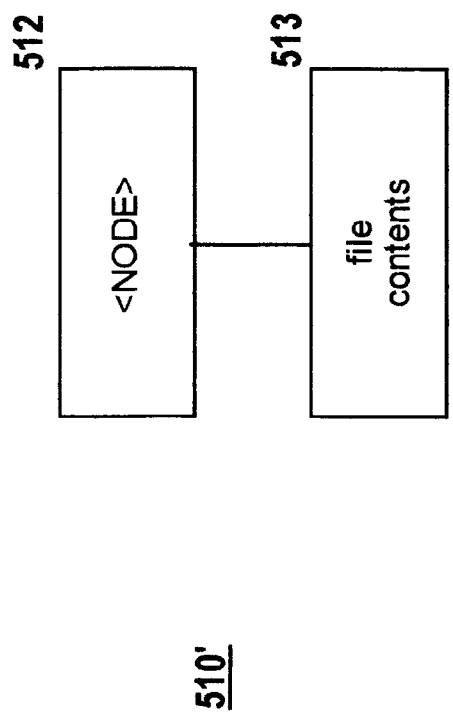

FIGS. 5A–5C illustrate another aspect of the present invention, whereby a file system is accessed in order to retrieve the dynamic information. In this aspect, a keyword such as "INCLUDE" (shown in tags 501 and 505 in FIG. 5A) indicates that a file system access is to be performed. A file descriptor will then be specified within the INCLUDE tag pair 501, 505. In the example 500 of FIG. 5A, a file descriptor in the form of a URI (Uniform Resource Identifier) has been shown at "URI" tag pair 502, 504. The value of this tag (at 503) then provides the descriptor that will be used to retrieve the file. A URI can be used to address entities on the Internet, local/remote file system entities, and other entities conforming to the URI naming syntax. Any URI that returns an XML document stream may be used as a tag value.

FIG. 5B shows the DOM tree 510 that corresponds to FIG. 5A. The dynamic include tag 501 is represented by node 514, and the URI tag is represented by node 516. FIG. 5C shows an abstract representation of the revised DOM tree 510' that results from retrieving the named file from the file system. The top-level node 512 is unchanged. The dynamic include node 514 and its child node 516 have been replaced by the results of the file retrieval, shown here abstractly as "file contents" node 513. As will be obvious to one of ordinary skill in the art, the actual contents of the file may be quite lengthy, and thus a representative example of the content at this level of the tree has not been provided in node 513.

The error-handling processing discussed above with reference to FIGS. 4F–4H may optionally be used with the dynamic file system retrieval syntax. The description of this processing applies to file system retrieval errors in the same manner discussed above for query processing.

Figure 5E:
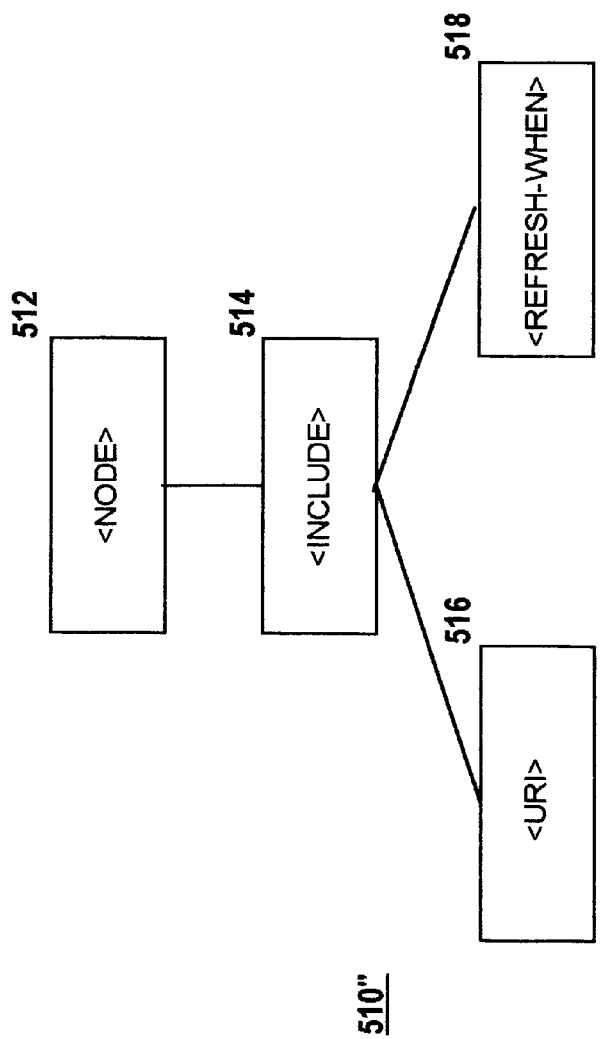

Dynamic queries and dynamic file system retrievals may include use of an optional feature of the present invention, whereby the dynamically-retrieved information is refreshed upon occurrence of a specified condition. This optional feature is illustrated in FIGS. 5D–5E with reference to the file system retrieval example used in FIG. 5. However, the syntax shown for the condition applies in an identical manner to the dynamic query.

Figure 9:
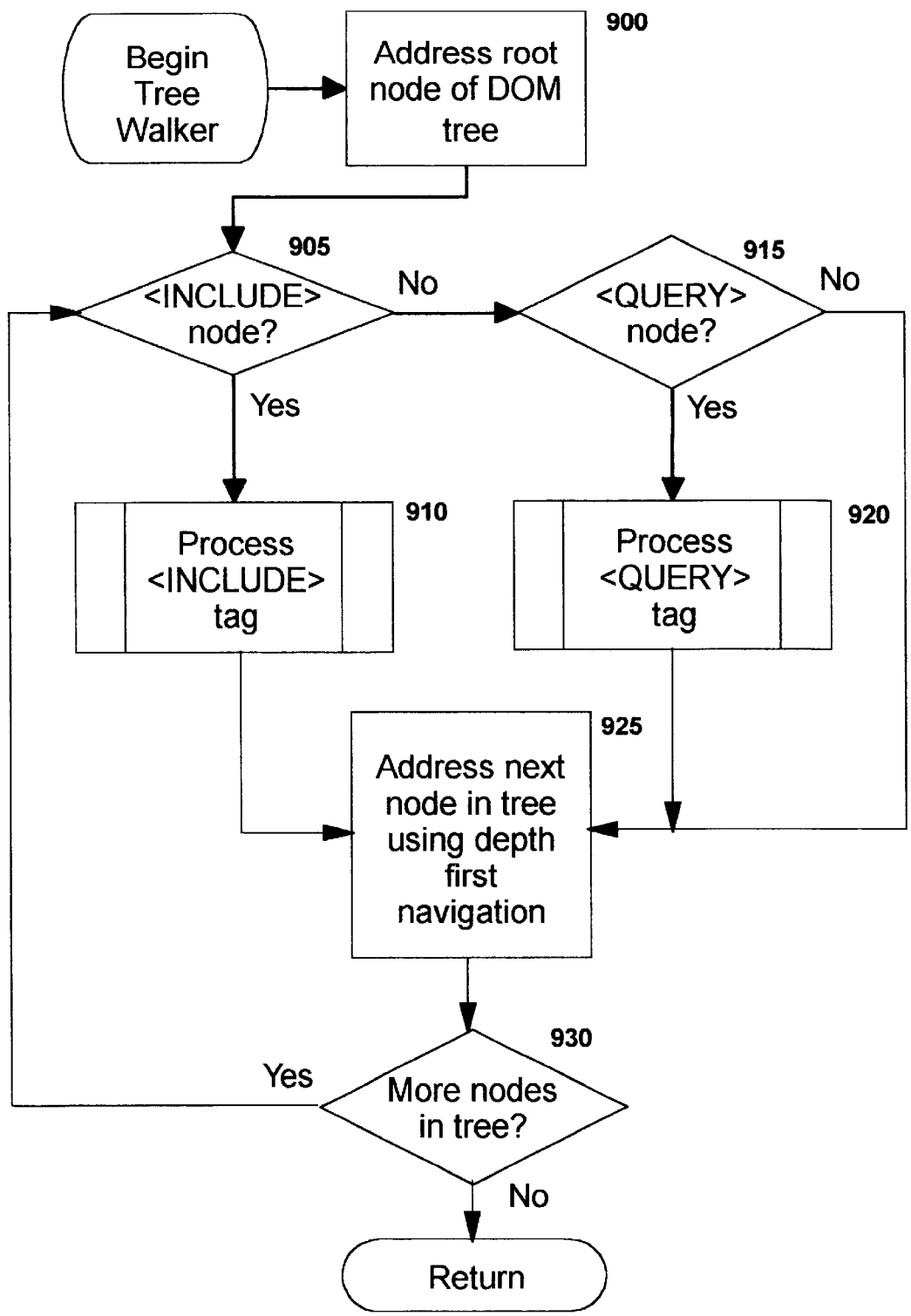

Refresh upon occurrence of a condition is specified using a condition document specified within conditional keyword tags. The keyword "REFRESH-WHEN" shown at 520 of FIG. 5D is a suggested keyword syntax. In the preferred embodiment, these conditional documents will be processed by a condition processor. This condition processor will recognize a predefined vocabulary of conditions. In the preferred embodiment, the condition processor will be invoked by periodically traversing the DOM tree looking for conditional tag nodes. (This is shown in the logic of FIG. 9 below.) The traversal process will preferably be invoked using a timer, according to techniques which are well known in the art. Alternatively, the traversal process may be invoked in other ways, such as in response to an event. Or, instead of using a tree traversal to detect conditional tag nodes, an alternative embodiment is to maintain a list of nodes which contain conditional tag nodes, and to process the conditions of the nodes pointed to by this list in response to the timer popping, the event occurring, etc.

In the example shown in FIG. 5D, the include tag now contains an additional tag pair "REFRESH-WHEN" 520, 522 in addition to the URI tag pair at 502. The condition document for the refresh is specified within the opening and closing refresh tags 520, 522. The condition document in this example (beginning at 521) specifies that the refresh is to occur based upon a compound condition, the syntax of which must be supported by the condition processor. In this example, the condition document specifies a Boolean expression that must evaluate to TRUE for the refresh to occur. The first part of this expression is shown here as "AT-INIT". This is intended to indicate to the condition processor that the condition of interest is "at initialization time", and may be used to cause selected dynamic retrievals (i.e. those specifying this condition) to occur on the first pass through the DOM tree. The condition document further indicates an "OR", followed by a second refresh condition. Support by the condition processor for this type of compound condition, and for conditions using a syntax such as "AT-INIT", is optional. When supported, other Boolean operators (such as "AND") may be available, and alternative keywords (such as "FIRST-TIME") may be used equivalently. (Conditions are further discussed below with reference to FIGS. 6, 10, and 12.)

The DOM tree that corresponds to a document containing conditional refresh tags includes an additional subtree corresponding to the tag. For the conditional refresh example shown in FIG. 5D, the DOM tree of FIG. 5B is extended by adding a second child node 518 as a child of the include node 514, as shown in FIG. 5E. This additional child node 518 contains the "REFRESH-WHEN" tag.

When using conditional refresh with the query processing syntax, the refresh subtree is a child of the query node, as further discussed below with reference to FIG. 6.

How the DOM tree is updated in response to conditional refresh processing depends on (1) whether the XML document specifies a query or a file retrieval, and (2) in the query case, whether a "QUERY-RESULTS" tag is present. For the file retrieval case, illustrated by FIG. 5D and 5E, the entire subtree corresponding to the include tag 501 (i.e. include node 514 and its children 516 and 518) will be replaced by the contents retrieved from the file specified at node 516. For the query where the "QUERY-RESULTS" tag is not present, the processing is identical. That is, the document retrieved by the query replaces the query node and the subtree beneath it. The processing of the last case, where there is a "QUERY-RESULTS" tag, will now be discussed.

Figure 6B:
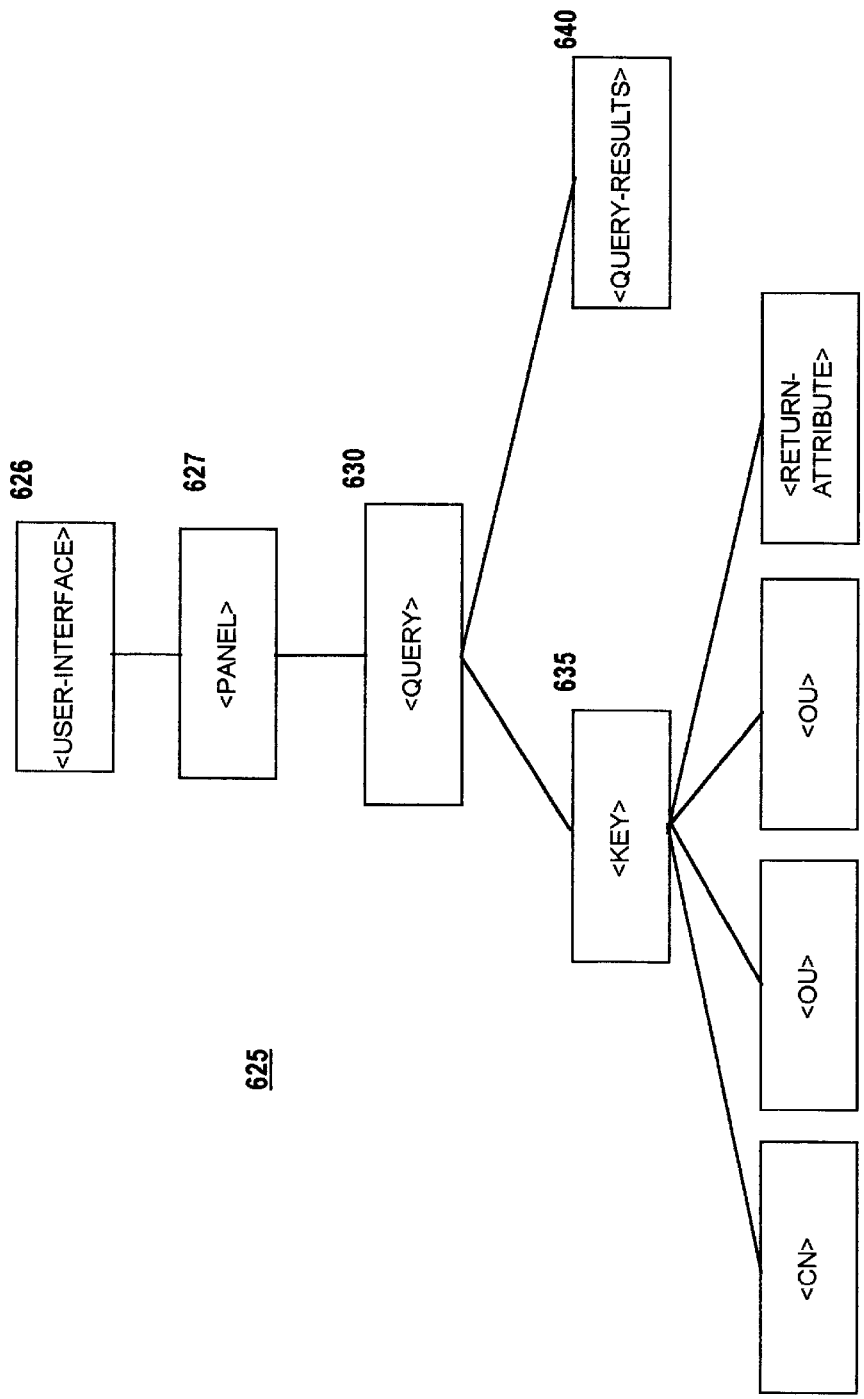

FIGS. 6A–6C illustrate an example of how the present invention uses XML notation to specify that the XML file contents (a user interface panel definition, in this example) should be periodically refreshed by retrieving current data from a database. Where document 400 specified a one-time query using the QUERY tag 403 in FIG. 4A, and the "REFRESH-WHEN" syntax illustrated in FIG. 5D provided a one-time content refresh, document 600 now specifies a repeatable refresh. This repeatable refresh is triggered by the presence of the "QUERY-RESULTS" tag pair 614, 616 (or other equivalent keyword syntax) within the query tag 605 (and its closing tag 620), and in the example shown in FIG. 6A will be triggered by the condition processor's traversal of the tree.

FIG. 6B shows the DOM tree 625 corresponding to the XML document 600. The first two levels 626, 627 of the tree of this example are static nodes corresponding to the tag pairs 601, 602 and 603, 604. The query tag 605 is represented by node 630. The query key encoded within the tags 610, 612 is represented by the node 635 and its subtree. The query-results tags 614, 616 are then represented by the node 640. When the refresh of this query occurs, the results that are retrieved will be appended as a subtree beneath node 640 (assuming the query is successful).

FIG. 6C shows an example of a repeatable refresh that is based upon occurrence of specified conditions. Here, the condition document is specified at 613, and indicates that the refresh is to occur every 15 minutes. In a preferred embodiment of the conditional processor, the predefined vocabulary will include support for the "EVERY" tag and the following list of subtags: "MILLISECONDS", "SECONDS", "MINUTES", and "HOURS". The subtree corresponding to the syntax of FIG. 6C is identical to that of FIG. 6B except that an additional subtree (not shown) below the query node 630 contains the tags corresponding to the condition document. This subtree will begin with a REFRESH-WHEN node, having a single child node for the "EVERY" tag, which itself has a single child node for the "MINUTES" tag.

FIGS. 7A–7B illustrate examples of how executable tasks may be represented in XML. In FIG. 7A, a task 700 is statically specified according to the prior art. The task 700 is designated by opening tag 705 and closing tag 735 as a transaction. The next tag pair 710, 730 indicates that this transaction is a payment. Suppose that this payment transaction represents a mortgage payment that is to be automatically performed each month for a bank customer. Electronic payments of this type are becoming quite common. A statically-specified task is adequate for this scenario, because the amount paid for a mortgage from month to month usually does not change. Tag 715 specifies the "FROM-ACCOUNT" to be used for the payment—i.e. where the funds for the mortgage payment are to be taken from. In this example, "1234.5" is used as the "from" account number and may represent a person's checking account number. Tag 720 then specifies the "TO-ACCOUNT" to be used, stating where the funds will be transferred to in order to make this payment. "1234.8" is used here as the "to" account number and may specify the mortgage loan account for this person. The tag 725 specifies the "AMOUNT" of the transaction, which in this example is $1250.00.

If the amount of the payment to be made by this transaction differs from month to month, the prior art XML syntax provides no mechanism to specify that the amount needs to change. While mortgage payments may not change, as stated above, electronic payments for things such as utilities are also becoming commonplace. In the absence of a fixed-amount billing arrangement, the monthly charge for utilities is normally different each month. FIG. 7B shows how the present invention may be used to accommodate this type of dynamic task, dynamically retrieving the amount due for a given customer and reflecting that amount in the payment transaction task. The opening tag 755 for the task again indicates that this is a transaction, and the next opening tag 760 indicates that this is a payment transaction, as in FIG. 7A. In this example, the source and destination of the funds in the payment are static: only the amount of the payment varies. Thus, the static syntax approach of the prior art is used for tags 765 and 770, and a dynamic query tag pair 775, 785 is encoded to retrieve the amount from a database. Tag 780 specifies a query parameter to be used in retrieving this information, where a CN tag encloses an account number "123-45-67-8" for this customer's utility account. This account number will be used as a parameter on a database query, which will return XML syntax. For purposes of illustration, assume the information stored in the database for this utility account indicates that the customer owes $123.45 for this month's bill. The result of the query will be formatted as "<AMOUNT>123.45</AMOUNT>", which will be substituted into the task tree corresponding to document 750 in place of the nodes corresponding to tags 775 through 785.

The manner in which the preferred embodiment of the present invention may be implemented will now be discussed with reference to the flowcharts in FIGS. 8 through 14.

Figure 8:
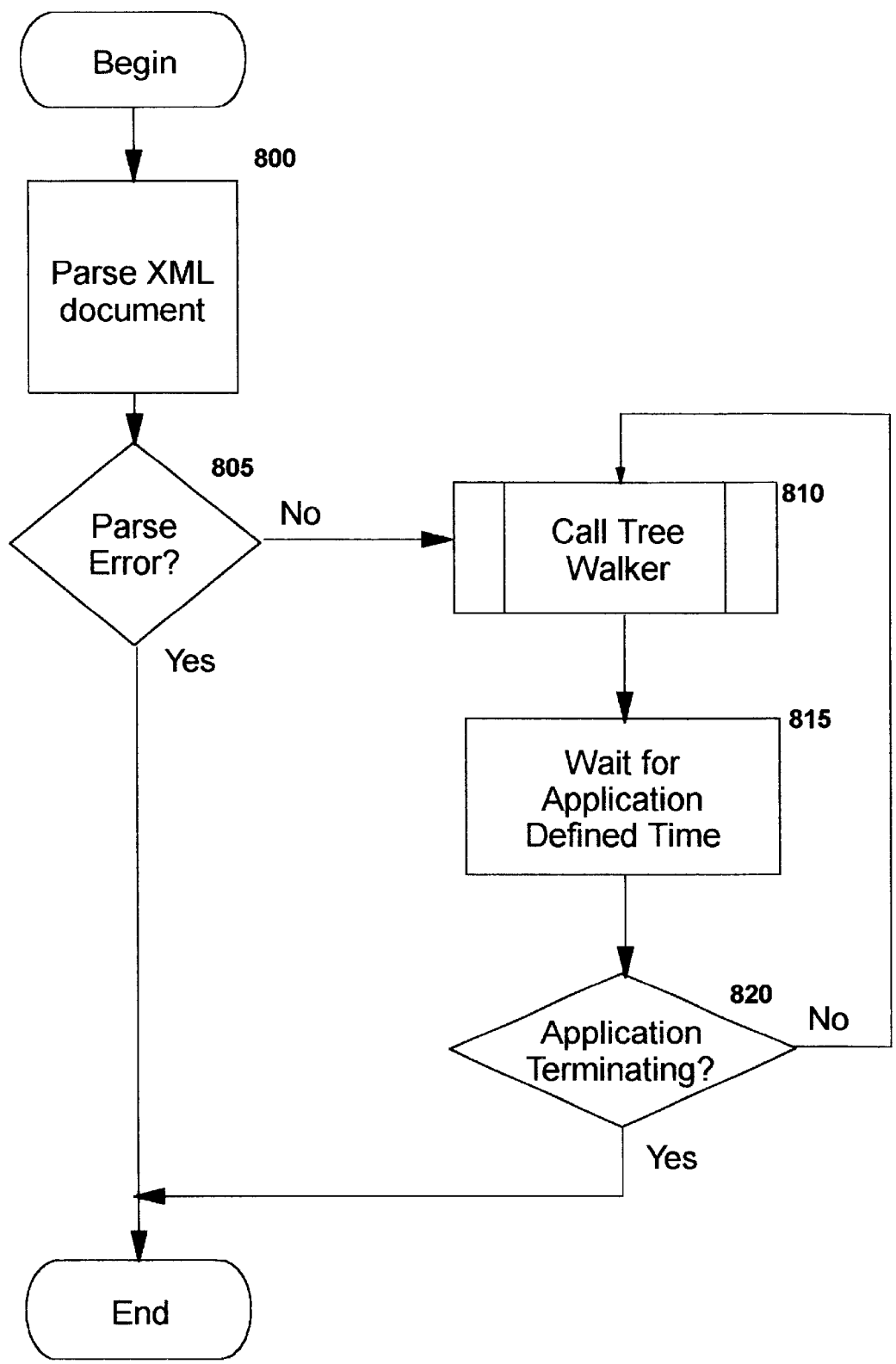
FIGS. 8–14 illustrate flow charts which set forth the logic which may be used to implement a preferred embodiment of the present invention.

FIG. 8 illustrates the top-level processing logic with which the preferred embodiment of the present invention may be implemented. The process begins at Block 800, where the input XML document is parsed. This parse operation will create a DOM tree representing the initial contents of the document in a static manner—that is, without executing the dynamic content retrievals. Block 805 asks if there was a parse error during this operation. If so, then processing ends. Otherwise, processing continues at Block 810.

Block 810 calls the "Tree Walker" routine, which is depicted in detail in FIG. 9. After returning from that call, Block 815 implements the process that waits until it is time to re-parse the DOM tree. As discussed earlier, a timer-driven approach is used for the preferred embodiment. Thus, the processing of FIG. 8 will block until the timer pops, at which time the processing will unblock and control will continue to Block 820. If an event-driven approach is used instead, then Block 815 implements the process that blocks until the event is signalled. Techniques for blocking with timers and with events are well known in the art.

At Block 820, a test is made as to whether the application is terminating. If so, the processing of FIG. 8 ends; otherwise, control returns to Block 810 to walk the DOM tree again.

FIG. 9 shows the logic that is preferably used to implement the tree walking (or tree traversal) process. At Block 900, the process begins by addressing the root node of the DOM tree. A repeating loop then begins at Block 905, traversing each node of the tree in turn. Block 905 asks if the current node contains an <INCLUDE> tag. If it does, then Block 910 invokes the routine which processes include tags (see FIG. 10). Otherwise, Block 915 receives control, and a test is made as to whether the current node contains a <QUERY> tag. If it does, Block 920 invokes the query processing routine (see FIG. 12). If the current node was neither an include nor a query, there is no dynamic processing to be done at this point, and control transfers to Block 925. Block 925 is also reached after processing an include tag or a query tag. Block 925 traverses to the next node in the DOM tree, preferably using a depth-first navigation. Breadth-first navigation may be used alternatively, without deviating from the inventive concepts disclosed herein. Techniques for both types of navigation are well known in the art. After navigating to the next node, Block 930 checks to see if there are more nodes remaining in the tree. If not, then the tree has been completely traversed, and processing returns from FIG. 9. Otherwise, processing continues by returning to Block 905 to check the contents of the now-current node.

Figure 10:
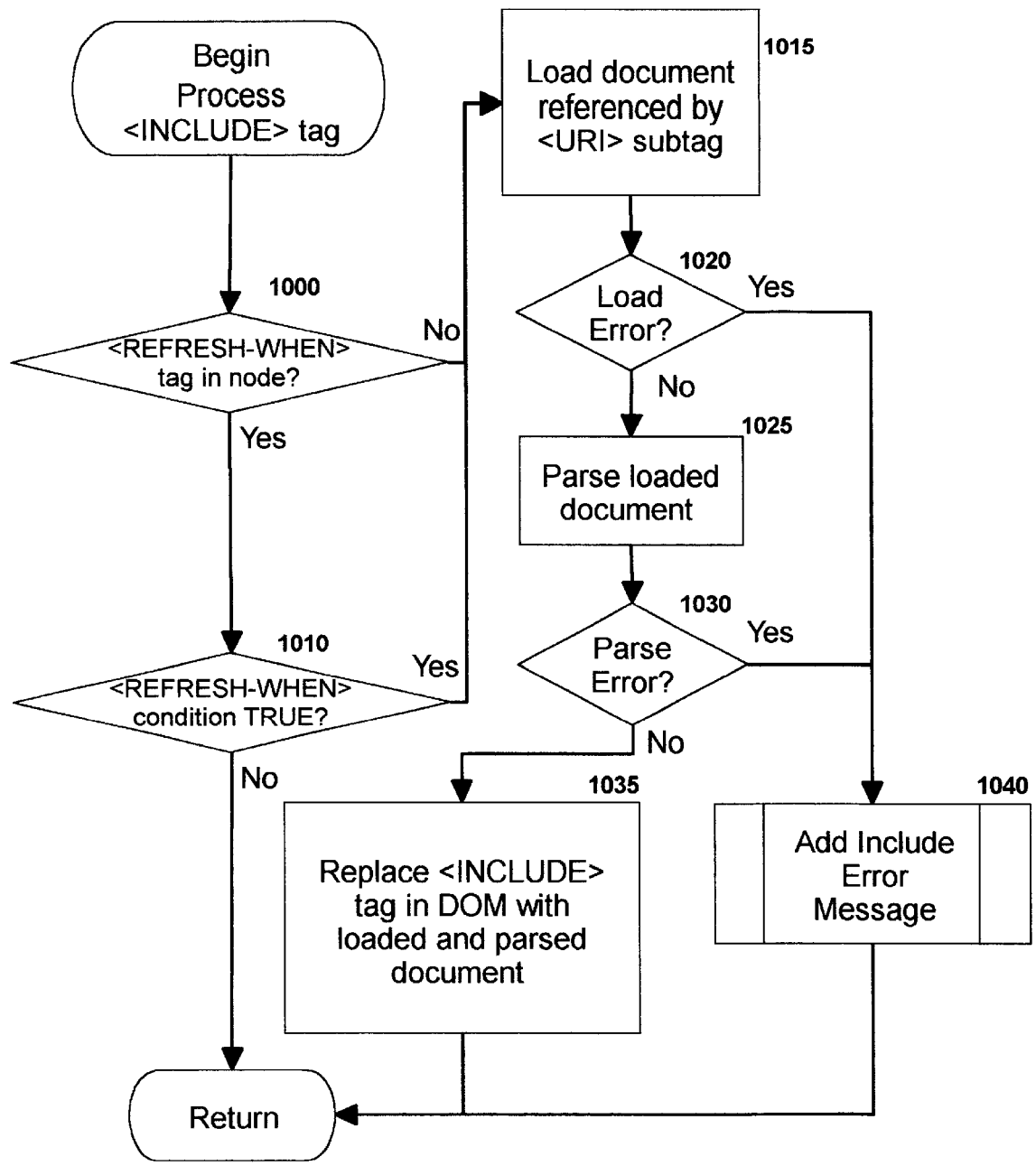

FIG. 10 depicts the preferred embodiment of the logic used to process include tags. At Block 1000, a test is performed to determine if this INCLUDE node has a REFRESH-WHEN node in its subtree, indicating that the include processing depends on a condition document. If this test has a negative response, control transfers to Block 1015 thereby treating the include processing as unconditional. When Block 1000 has a positive response, then Block 1010 asks whether the conditions in the condition document evaluate to TRUE. If not, then it is not yet appropriate to perform the include processing, and control returns from FIG. 10. Otherwise, when the conditions are met, control transfers to Block 1015 to perform the include processing.

Block 1015 loads the document referenced by the descriptor in the <URI> subtag, where this subtag will be in a URI node that is a child of the INCLUDE node. Block 1020 checks to see if this load process encountered an error. If so, the error processing for includes is invoked by transferring control to Block 1040. This processing is presented in FIG. 11. When no error was encountered, Block 1025 will parse the document that has been loaded. If the parse encounters an error (Block 1030), the error processing for includes is invoked (Block 1040). Otherwise, the DOM tree will be revised to replace the INCLUDE node (and its subtree, if it has one) with the document that has been loaded and parsed (Block 1035). After Block 1035 has been executed, the DOM tree for the INCLUDE no longer contains any dynamic nodes or tags. However, dynamic nodes may remain in the tree if a load or parse error occurs, such that the replacement processing of Block 1035 is not executed for those nodes on this pass through the tree. Any such remaining tags will be re-evaluated on a subsequent pass.

After completing Block 1035 or Block 1040, control returns from the processing flow of FIG. 10.

Figure 11:
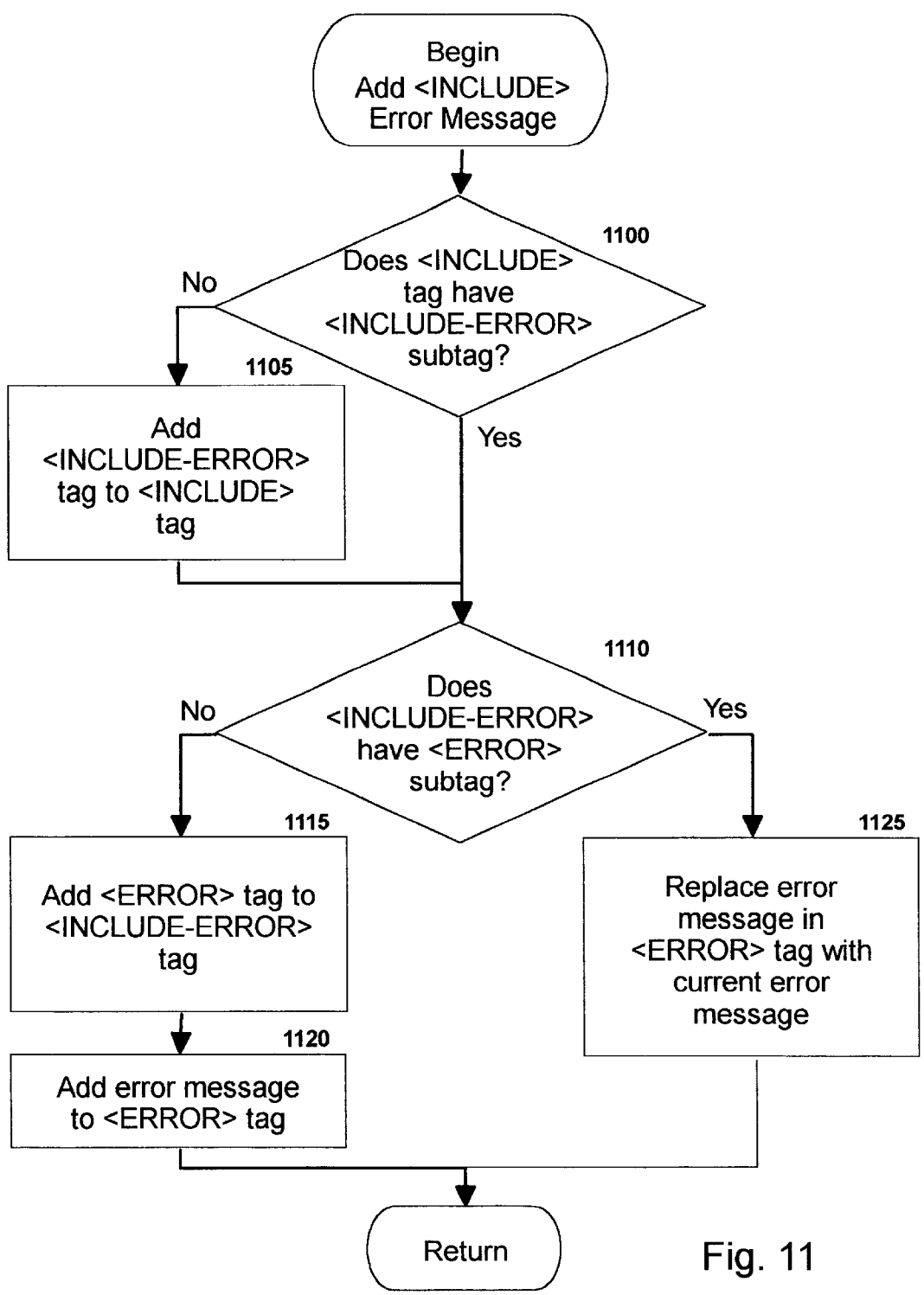

FIG. 11 depicts the error processing for includes, which is used in response to load errors (Block 1020 of FIG. 10) and parse errors (Block 1030 of FIG. 10). The processing begins (Block 1100) by checking to see if the include node has a child node containing an INCLUDE-ERROR tag. An include-error node will exist if one was encoded in the original XML document from which the DOM tree was created, or if the error processing of FIG. 11 has been previously executed for the current include node. If an include-error node does not yet exist, Block 1105 creates one as a child of the include node. Block 1110 then checks to see if the INCLUDE-ERROR node has a child node containing an ERROR tag. If not, then Block 1115 will create one, and Block 1120 will insert an error message into that error node. The error message content will be supplied by the program that is traversing the tree. A predefined error message may have been coded into the program for use in this situation; multiple messages may have been coded, where an error message identifier obtained at Block 1020 or 1030 is used to select the appropriate one; a message index may be used to retrieve an appropriate message from a data store; etc. These approaches to message text processing are well known in the art.

If the test in Block 1110 has a positive result, then the existing message text in the error tag is replaced with the text for the current error (Block 1125). This will occur if errors are encountered more than once during processing of an include node.

Following completion of Block 1120 or Block 1125, the flow of FIG. 11 exits, returning control to the invoking code.

Figure 12:
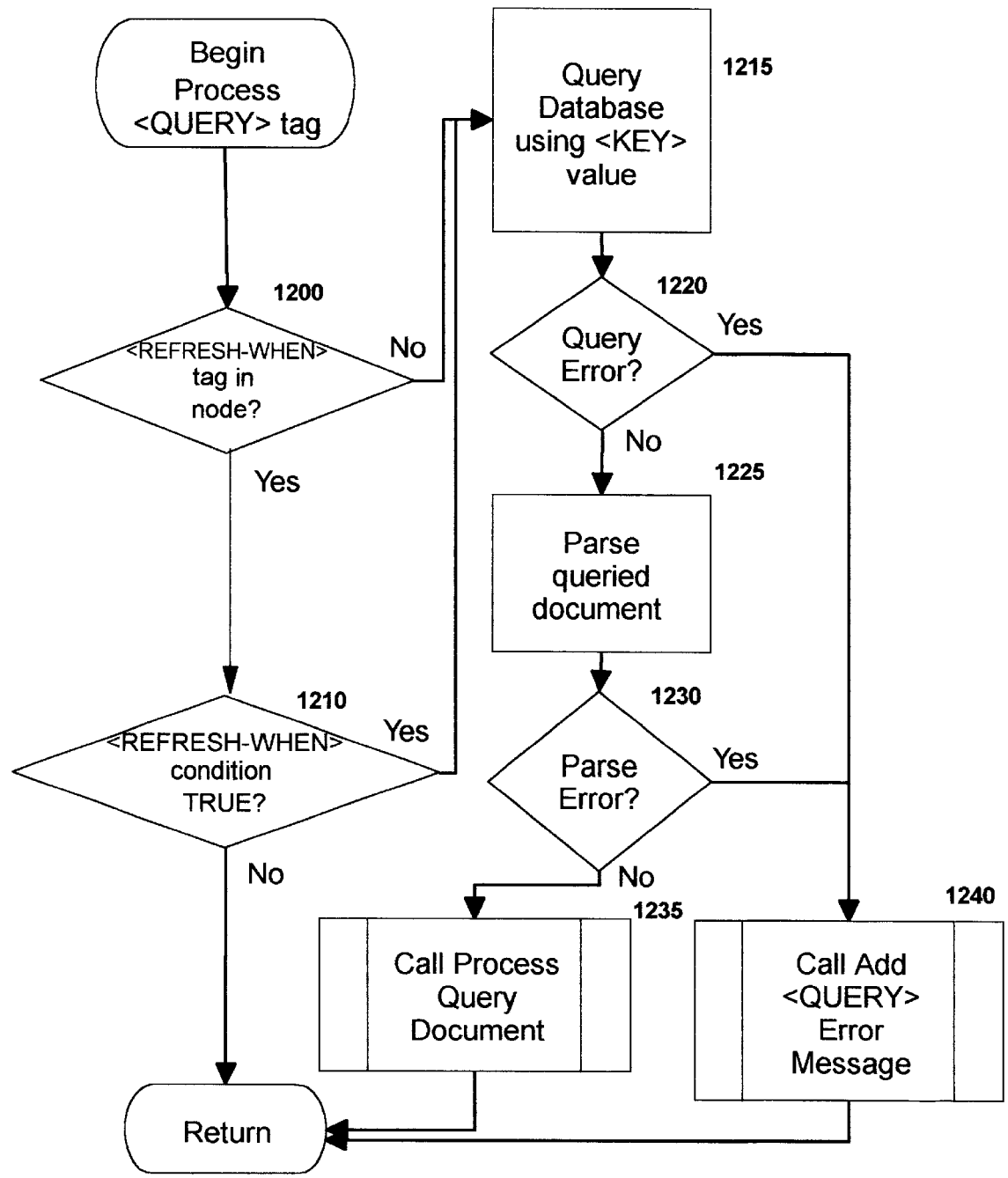

The processing for a query node is depicted in FIG. 12. Block 1200 performs a test to determine if this QUERY node has a REFRESH-WHEN node in its subtree, indicating that the query processing depends on a condition document. If this test has a negative response, control transfers to Block 1215 thereby treating the query processing as unconditional. When Block 1200 has a positive response, then Block 1210 asks whether the conditions in the condition document evaluate to TRUE. If not, then it is not yet appropriate to perform the query processing, and control returns from FIG. 12 to the invoking code. Otherwise, when the conditions are met, control transfers to Block 1215 to perform the query processing.

Figure 13:
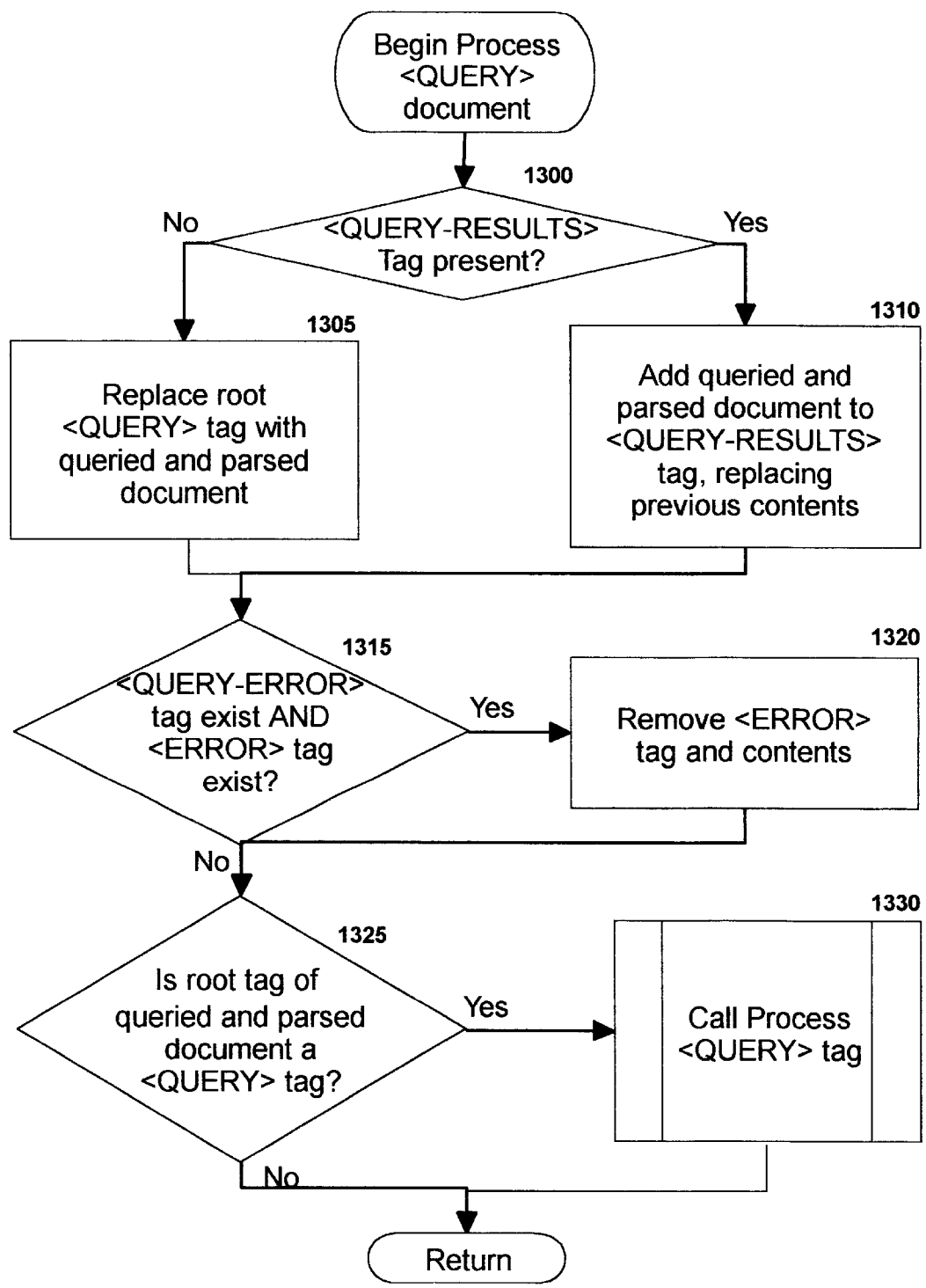

Block 1215 queries the database using the parameters from the <KEY> subtag, where this subtag will be in a KEY node that is a child of the QUERY node. Block 1220 checks to see if this database query encountered an error. If so, the error processing for queries is invoked by transferring control to Block 1240. The details of this processing are presented in FIG. 14. When no error was encountered, Block 1225 will parse the document that has been retrieved from the database. If the parse encounters an error (Block 1230), the error processing for queries is invoked (Block 1240). Otherwise, the query processing logic depicted in FIG. 13 is invoked (Block 1235). Following completion of Block 1235 or Block 1240, the processing flow returns from FIG. 12 to the invoking logic.

The logic of FIG. 13 is invoked to process a successfully retrieved and parsed query (from Block 1235 of FIG. 12). In Block 1300, a test is made to determine whether the QUERY node has a child node containing a QUERY-RESULTS tag. This tag is present when a query is to be periodically repeated (see the examples in FIGS. 6A and 6C). If the tag is not present, then the DOM tree is revised to replace the query tag and any subtree beneath it by the parsed query result (Block 1305). Following the processing of Block 1305, the DOM tree for the QUERY no longer contains any dynamic nodes or tags. However, dynamic nodes may remain in the tree if a database query or parse error occurs, such that the replacement processing of Block 1305 is not executed for those nodes on this pass through the tree. Any such remaining tags will be re-evaluated on a subsequent pass.

When a QUERY-RESULTS node is present, the parsed query result is inserted into the DOM tree as a subtree beneath that node (Block 1310), replacing any subtree that previously existed (and which would have represented the results of an earlier query).

Block 1315 is reached following either Block 1305 or Block 1310. This block tests whether both QUERY-ERROR and ERROR nodes already exist in nodes of the DOM tree. If so, the ERROR node and its contents are removed (Block 1320). Otherwise, or following completion of Block 1320, Block 1325 checks to see if the parsed query result has a QUERY tag as its root. If so, then recursive processing of the query is required. Block 1320 is invoked to perform the recursive invocation of the logic of FIG. 13. If the parsed query result does not begin with a QUERY tag, or upon completion of the recursive invocation, control exits from FIG. 13.

Figure 14:
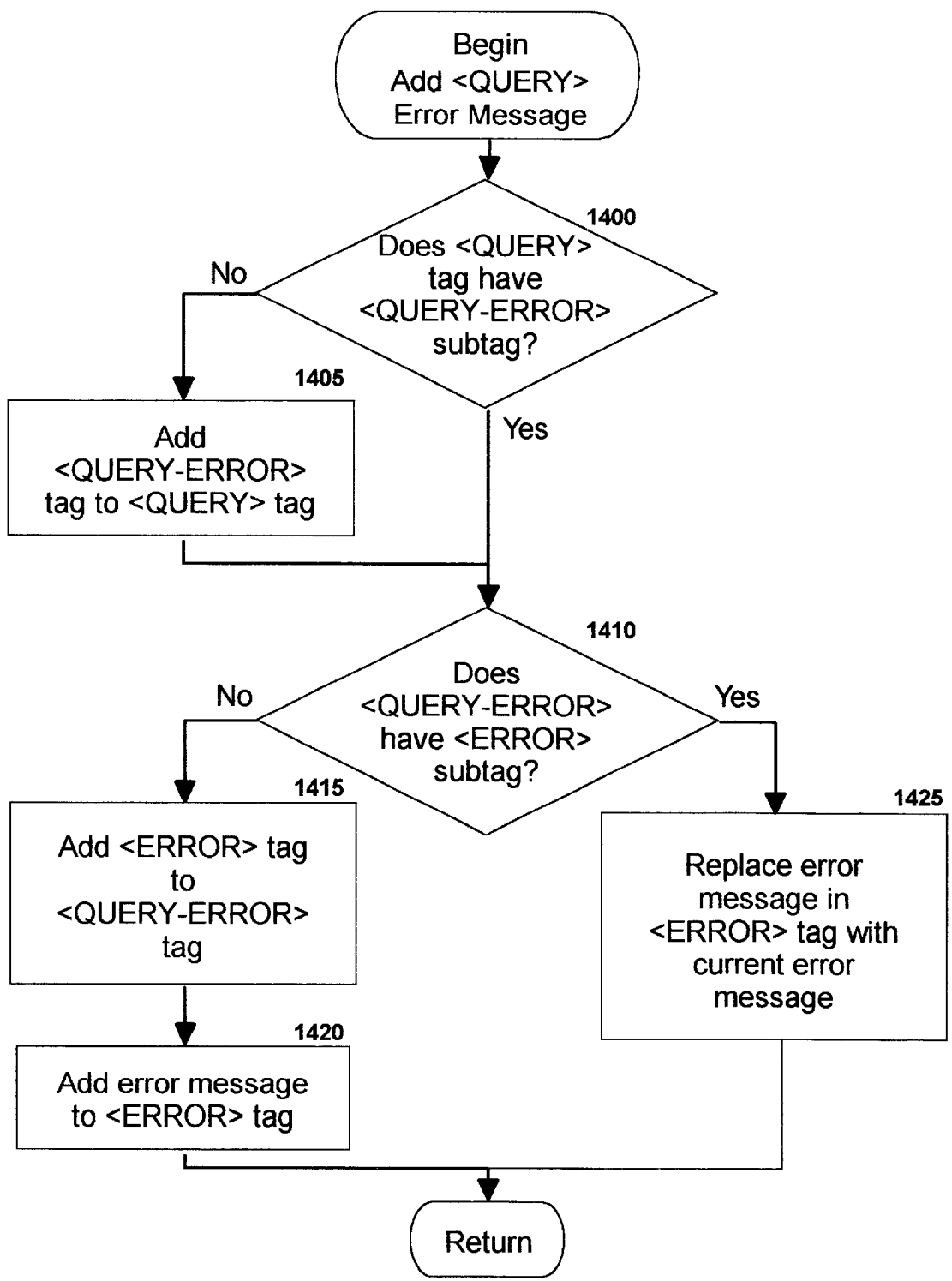

FIG. 14 depicts the error processing for query nodes, which is used in response to database retrieval errors (Block 1220 of FIG. 12) and parse errors (Block 1230 of FIG. 12). The processing begins (Block 1400) by checking to see if the query node has a child node containing a QUERY-ERROR tag. A query-error node will exist if one was encoded in the original XML document from which the DOM tree was created, or if the error processing of FIG. 14 has been previously executed for the current query node. If a query-error node does not yet exist, Block 1405 creates one as a child of the query node. Block 1410 then checks to see if the QUERY-ERROR node has a child node containing an ERROR tag. If not, then Block 1415 will create one, and Block 1420 will insert an error message into that error node. The error message content will be supplied by the program that is traversing the tree, as discussed above with respect to FIG. 11 for include error messages.

If the test in Block 1410 has a positive result, then the existing message text in the error tag is replaced with the text for the current error (Block 1425). This will occur if errors are encountered more than once during processing of a query node.

Following completion of Block 1420 or Block 1425, the flow of FIG. 14 exits, returning control to the invoking code.

Techniques have been described for specifying and performing queries and file system retrievals to obtain dynamic data, for specifying that the query or file system retrieval is to be refreshed, and for specifying that the query refresh is to periodically repeat. These techniques may be implemented independently, or support for the techniques may be implemented in an integrated manner. In addition, a technique for retrieving dynamic information based on a dynamically-obtained value (as the query key or the file descriptor) has been specified, and a technique has been defined for handling error conditions. These techniques are options that may be implemented with any or all of the query and file system retrieval approaches.

While the preferred embodiment of the present invention has been described, additional variations and modifications in that embodiment may occur to those skilled in the art once they learn of the basic inventive concepts. The techniques disclosed herein are based partially upon certain predefined characteristics of the XML notation. It will be obvious to one of ordinary skill in the art that the inventive concepts disclosed herein may be adapted to changes in the notation, should they occur. The inventive concepts may also be used with notations other than XML that provide the same characteristics described herein for XML documents, and with modelling techniques other than DOM trees that exhibit the required properties discussed for DOM trees (i.e. the modelling technique creates a tree that represents the structure and content described in the particular notation.) Therefore, it is intended that the appended claims shall be construed to include both the preferred embodiment and all such variations and modifications as fall within the spirit and scope of the invention.

We claim:

1. In a computing environment having a connection to a network, computer readable code readable by a computer system in said environment, for periodically refreshing Document Object Model (DOM) trees, comprising:
    a subprocess for reading an input file encoded in a derivative of Standard Generalized Markup Language (SGML);
    a subprocess for creating a DOM tree from said encoded file during said reading;
    a subprocess for traversing said created DOM tree to search for repeatable refresh tags therein, each of which specifies one or more conditions for dynamically refreshing data in said DOM tree;
    a subprocess for invoking a dynamic data retrieval for each of said detected repeatable refresh tags when said one or more conditions specified on said each tag evaluate to true, wherein said dynamic data retrieval uses one or more parameters specified in said encoded file; and
    a subprocess for revising said DOM tree to incorporate data retrieved with each of said invoked dynamic data retrievals, wherein said subprocess for revising leaves each of said detected repeatable refresh tags intact in said DOM tree in order that they may trigger subsequent refreshes.

2. Computer readable code for periodically refreshing DOM trees according to claim 1, further comprising a subprocess for updating said encoded file to incorporate data retrieved with each of said invoked dynamic data retrievals.

3. Computer readable code for periodically refreshing DOM trees according to claim 1, further comprising a subprocess for detecting one or more error-handling tags that may be specified with each of said detected repeatable refresh tags; and
    wherein said subprocess for revising said DOM tree further comprises a subprocess for revising said DOM tree to incorporate default content specified in said encoded file for said detected error-handling tags when said invoked dynamic data retrieval returns an error condition.

4. Computer readable code for periodically refreshing DOM trees according to claim 1, wherein said derivative is Extensible Markup Language (XML).

5. Computer readable code for periodically refreshing DOM trees according to claim 1, wherein said detected repeatable refresh tags specify a database query retrieval.

6. Computer readable code for periodically refreshing DOM trees according to claim 1, wherein said specified conditions for dynamically refreshing data include a condition specifying a periodic time interval, and wherein said subprocesses for invoking and for revising are repeated at said specified periodic time interval.

7. A system for periodically refreshing Document Object Model (DOM) trees, comprising:
    means for reading an input file encoded in a derivative of Standard Generalized Markup Language (SGML);
    means for creating a DOM tree from said encoded file during said reading;
    means for traversing said created DOM tree to search for repeatable refresh tags therein, each of which specifies one or more conditions for dynamically refreshing data in said DOM tree;
    means for invoking a dynamic data retrieval for each of said detected repeatable refresh tags when said one or more conditions specified on said each tag evaluate to true, wherein said dynamic data retrieval uses one or more parameters specified in said encoded file; and
    means for revising said DOM tree to incorporate data retrieved with each of said invoked dynamic data retrievals, wherein said means for revising leaves each of said detected repeatable refresh tags intact in said DOM tree in order that they may trigger subsequent refreshes.

8. The system for periodically refreshing DOM trees according to claim 7, further comprising means for updating said encoded file to incorporate data retrieved with each of said invoked dynamic data retrievals.

9. The system for periodically refreshing DOM trees according to claim 7, further comprising means for detecting one or more error-handling tags that may be specified with each of said detected repeatable refresh tags; and
    wherein said means for revising said DOM tree further comprises means for revising said DOM tree to incorporate default content specified in said encoded file for said detected error-handling tags when said invoked dynamic data retrieval returns an error condition.

10. The system for periodically refreshing DOM trees according to claim 7, wherein said derivative is Extensible Markup Language (XML).

11. The system for periodically refreshing DOM trees according to claim 7, wherein said detected repeatable refresh tags specify a database query retrieval.

12. The system for periodically refreshing DOM trees according to claim 7, wherein said specified conditions for dynamically refreshing data include a condition specifying a periodic time interval, and wherein said subprocesses for invoking and for revising are repeated at said specified periodic time interval.

13. A method for periodically refreshing DOM trees, comprising the steps of:

reading an input file encoded in a derivative of Standard Generalized Markup Language (SGML);

creating a DOM tree from said encoded file during said reading;

traversing said created DOM tree to search for repeatable refresh tags therein, each of which specifies one or more conditions for dynamically refreshing data in said DOM tree;

invoking a dynamic data retrieval for each of said detected repeatable refresh tags when said one or more conditions specified on said each tag evaluate to true, wherein said dynamic data retrieval uses one or more parameters specified in said encoded file; and revising said DOM tree to incorporate data retrieved with each of said invoked dynamic data retrievals, wherein said revising step leaves each of said detected repeatable refresh tags intact in said DOM tree in order that they may trigger subsequent refreshes.

14. The method for periodically refreshing DOM trees according to claim 13, further comprising the step of updating said encoded file to incorporate data retrieved with each of said invoked dynamic data retrievals.

15. The method for periodically refreshing DOM trees according to claim 13, further comprising the step of detecting one or more error-handling tags that may be specified with each of said detected repeatable refresh tags; and wherein said revising step further comprises the step of revising said DOM tree to incorporate default content specified in said encoded file for said detected error-handling tags when said invoked dynamic data retrieval returns an error condition.

16. The method for periodically refreshing DOM trees according to claim 13, wherein said derivative is Extensible Markup Language (XML).

17. The method for periodically refreshing DOM trees according to claim 13, wherein said detected repeatable refresh tags specify a database query retrieval.

18. The method for periodically refreshing DOM trees according to claim 13, wherein said specified conditions for dynamically refreshing data include a condition specifying a periodic time interval, and wherein said subprocesses for invoking and for revising are repeated at said specified periodic time interval.

* * * * *